United States Patent Office 3,071,335
Patented Jan. 1, 1963

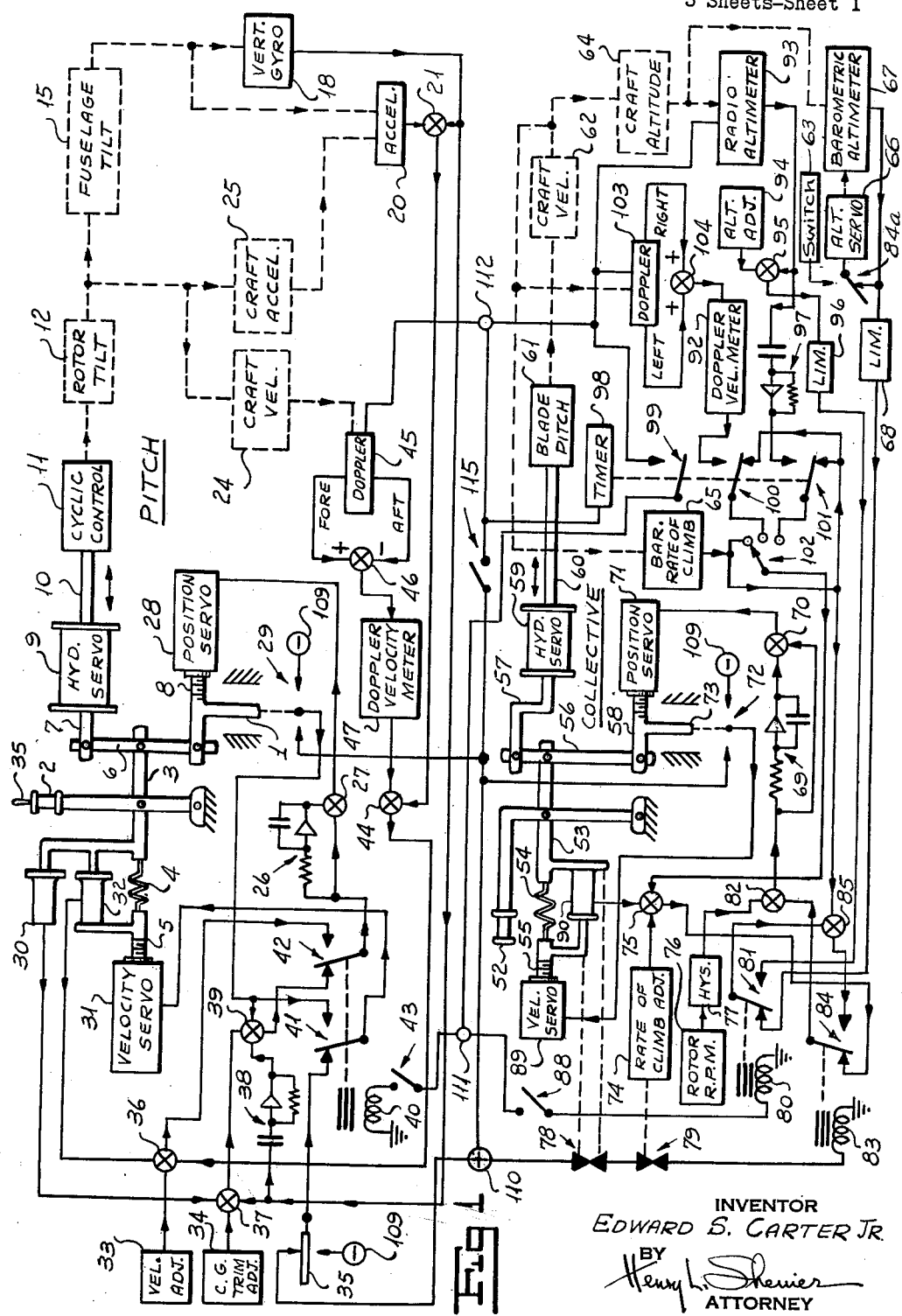

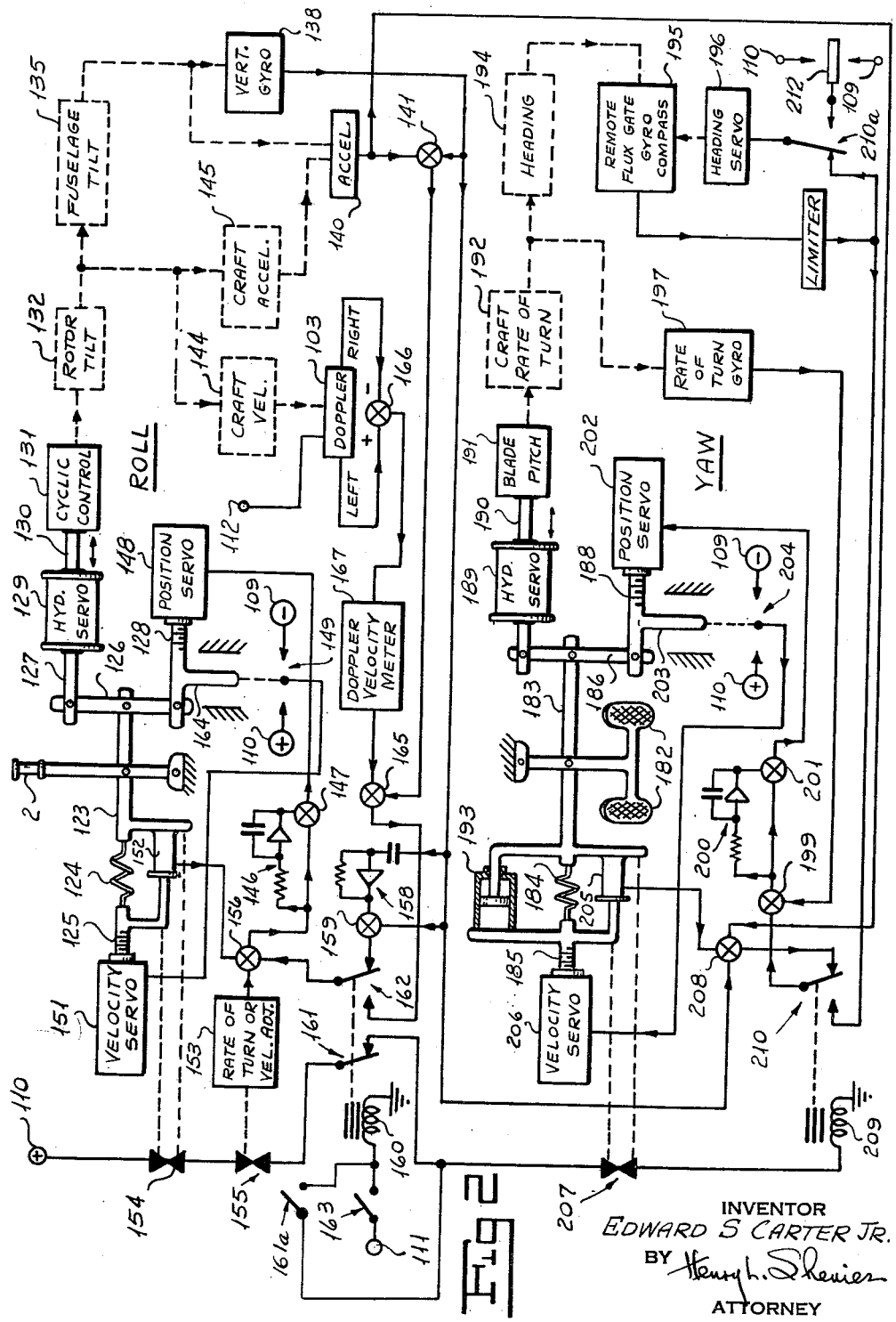

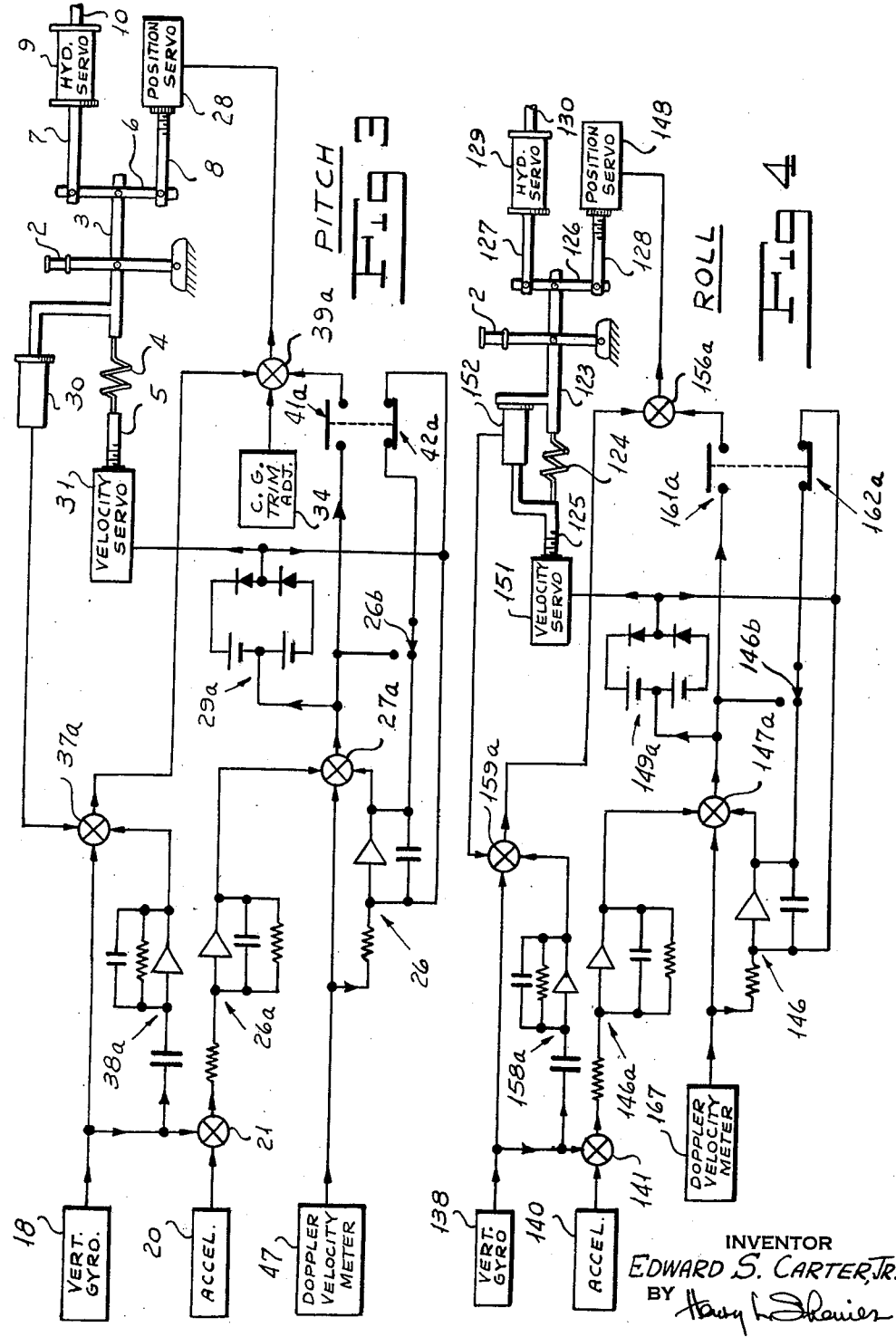

3,071,335
FLIGHT CONTROL SYSTEM
Edward S. Carter, Jr., Fairfield, Conn., assignor to United Aircraft Corporation, East Hartford, Conn., a corporation of Delaware
Filed Oct. 3, 1958, Ser. No. 765,240
28 Claims. (Cl. 244—77)

My invention relates to a flight control system and more particularly to a control system for helicopters.

In some flight control systems of the prior art, the pilot could introduce his commands only by overpowering or opposing the system or by entirely disconnecting the system. In other flight control systems of the prior art, some pilot commands are assisted by the system; but the pilot must continually make adjustments to the system so that it will not oppose him. Consequently, flight control systems of the prior art do not cause the craft to respond to the pilot's control movements in the same manner as if the system were disconnected. In some flight control systems of the prior art, there is always a residual steady state error owing to the fact that the gain of the system cannot be increased without causing instability. In other systems of the prior art, integrators are used to reduce the steady state error to zero. These systems, however, are subject to the disadvantage that if commands are imposed or initial errors exist, the integrators will run away. Especially in helicopter control systems of the prior art, continuous adjustments must be made to keep the system operative for variations in speed and power through a complete flight regime.

One object of my invention is to provide a flight control system over which, at all times, the pilot has complete control and which never opposes but always assists the pilot's commands.

Another object of my invention is to provide a flight control system in which the pilot's control movements produce craft responses similar to those which would result were the system disconnected.

A further object of my invention is to provide a flight control system which employs integrators to reduce the steady state error to zero where, at all times, the input of each integrator is responsive to its output so that no integrator will run away.

Still another object of my invention is to provide a helicopter control system operative throughout a complete flight regime from full speed to hover and from full power to autorotation without the necessity for continual readjustment.

A still further object of my invention is to provide a helicopter control system which, from any speed, altitude, and heading, will bring the craft motionless to a hover headed into the wind at a selected altitude.

Other and further objects of my invention will appear from the following description:

In general my invention contemplates comparing electrical signals from sensors responsive to pilot control movements with signals from transducers representing the natural craft motions which would result from such control movements and using the difference signal to actuate a position servomotor of limited authority which introduces small corrections independently of the pilot's controls. If the limited authority independent control exercised by the position servomotor is insufficient to reduce the difference signal to zero, then the pilot's controls are automatically repositioned until the difference signal is zero. By properly adjusting the gains of the pilot control sensors and craft motion transducers, the corrections required from the position servomotor can be reduced to a minimum and the craft response to pilot commands will be substantially the same as those resulting were the control system disconnected. To reduce the steady state error to precisely zero and achieve an exact null, I integrate the difference signal and couple to the position servomotor the sum of the difference signal and the integrated difference signal. I provide switches associated with the pilot's controls to change the craft motion transducers, the electrical signals of which are compared with those of the pilot's control sensors. Thus pilot command control movements automatically switch in and out of the system appropriate craft motion transducers, enabling a precise null and preventing the difference signal integrator from running away.

The instant application is an improvement over the copending application of Walter Gerstenberger and Harry Jensen, Serial No. 372,265, filed August 4, 1953, now abandoned in favor of continuation application Serial No. 741,531, filed June 12, 1958, now Patent No. 3,037,722.

In the accompanying drawings which form part of the instant specification and which are to be read in conjunction therewith and in which like reference numerals are used to indicate like parts in the various views:

FIGURE 1 is a schematic view showing a simplified form of the pitch and collective channels of my flight control system.

FIGURE 2 is a schematic view showing a simplified form of the roll and yaw channels of my flight control system.

FIGURE 3 is a fragmentary schematic view showing a preferred form of the pitch channel of my flight control system.

FIGURE 4 is a fragmentary schematic view showing a preferred form of the roll channel of my flight control system.

Referring more particularly now to the pitch channel of FIGURE 1, the pilot's cyclic control stick 2 when moved fore and aft controls the pitch of the craft. The cyclic stick 2 is pivoted at one end in the frame of the craft and is journaled at an intermediate point to link 3. Link 3 is journaled to the input shaft 7 of an hydraulic position servomotor 9, the output shaft 10 of which is connected to the cyclic swash plate pitch control 11. The other end of linkage 6 is connected to the output shaft 8 of an electrical position servomotor 28. A depending leg 1 of shaft 8 is adapted to act as a limit stop, such that the output shaft 8 of position servo 28 can move only between predetermined limits. Link 3 is connected by means of a pilot's feel centering spring 4 to the output shaft 5 of an integrating or velocity servomotor 31. The case of a transducer 32 is connected to velocity servo output shaft 5; and the input shaft of position transducer 32 is connected to link 3. Position transducer 32 provides an electric output signal proportional to the relative motion between shaft 5 and link 3 and hence proportional to the tension or compression of the pilot's feel centering spring 4. The case of a transducer 30 is attached to the frame of the aircraft; and the input shaft of transducer 30 is connected to link 3. Transducer 30 provides an electric signal representing the absolute position of link 3 and hence of the pilot's pitch cyclic control stick 2. Movement of the pitch cyclic control 11 causes a rotor tilt 12 in pitch such that the plane of the main rotor 12 tends to align itself with the plane of the swash plate cyclic control 11. The main rotor drive shaft, which is attached to the fuselage, tends to align itself with the resultant lift vector; and hence fuselage tilt 15 is responsive to rotor tilt 12. A pendulous vertical gyroscope gravitationally erected is provided with a pitch pickoff 18 responsive to the fuselage tilt 15 relative to the horizon. A step function or sudden change in rotor tilt 12 about the pitch axis will produce an immediate fore and aft craft acceleration 25, which will decay exponentially to zero and will also produce a delayed response or exponential change in craft airspeed 24 to a new steady state value. Because of the damping associated with the horizontal flow of air through a rotor having a tilt about the pitch axis relative to the horizon, there is always a certain craft airspeed 24 associated with a certain rotor tilt 12 relative to the horizon; and as the craft velocity 24 approaches this value, the craft acceleration 25 approaches zero. For example, assume that the steady state forward air speed for a forward rotor tilt of 10° from horizontal is 30 knots and that steady state forward air speed for a forward rotor tilt of 20° from horizontal is 60 knots. If the craft has an air speed of 30 knots and the rotor tilt is increased from 10° to 20°, the air speed will exponentially increase from 30 knots with a large initial acceleration to a final air speed of 60 knots where the acceleration approaches zero. The acceleration is proportional to the difference between the actual air speed and the steady state air speed for any given value of rotor tilt about the pitch axis relative to the horizon. Thus the decrease in acceleration is exponential in nature. An accelerometer 20 mounted on the fuselage of the craft is responsive not only to craft acceleration fore and aft 25 but also to fuselage tilt 12 about the pitch axis relative to the horizon. The accelerometer 20 is mounted so that its sensing element moves in a direction parallel to the longitudinal axis of the fuselage. Accelerometer 20 thus provides an electrical output signal proportional to a combination of horizontal craft acceleration 25 and fuselage tilt 15 relative to the horizon. Doppler radar equipment is also mounted on the craft fuselage and is responsive to the craft velocity relative to the terrain below. It is desired to distinguish between forwards and sidewards velocities and also between horizontal and vertical velocities. Accordingly, as will be appreciated by those skilled in the art, the transmitting antenna should emit omnidirectional radiation and may hence comprise a biconical horn having a vertically oriented axis to provide a uniform horizontal field pattern. So that there is an appreciable downward component of transmitted field, either the horn may have a fairly large flair angle or preferably the horn is asymmetrical such that the upper portion approaches a degenerate cone having the shape of a flat disk. As will be further appreciated by those skilled in the art, four identical highly directional receiving horns are oriented to receive reflected radiation respectively from left, right, fore, and aft. The output of each receiving horn is impressed upon an associated discriminator circuit. The fore-and-aft Doppler section is indicated by the reference numeral 45 and is responsive to craft fore-and-aft velocity 24 relative to the terrain below. If the craft is moving forward, the forward horn will receive a frequency higher than that transmitted while the aft horn will receive a frequency lower than that transmitted. If both the fore and aft discriminators produce voltages of one polarity for frequencies higher than transmitted and voltages of the opposite polarity for frequencies lower than transmitted, then the discriminator output signals from the fore-and-aft Doppler section 45 must be differentially combined through a subtraction network 46 as indicated by the plus and minus signs. Thus as the craft moves forward the fore and aft discriminators produce equal voltages of opposite polarity; and subtraction network 46 provides an output voltage proportional to ground speed. The output of subtraction network 46 is impressed upon a Doppler fore-and-aft velocity meter 47. It will be appreciated that meter 47 receives a horizontal velocity signal independent of any vertical velocity. Suppose the craft is moving downwardly. Both fore and aft horns will receive frequencies higher than transmitted. Both fore and aft discriminators will produce equal voltages of the same polarity; and the output of subtraction networks 46 will be zero. The output signals of the accelerometer 20 and vertical gyro 18 are combined in a summing network 21 such that the output of network 21 is an electrical signal proportional only to fore and aft craft acceleration 25 and independent of fuselage tilt 12 about the pitch axis relative to the horizon. It will be appreciated that if accelerometer 20 is mounted on the stable platform provided by the vertical gyro 18, rather than on the fuselage, then its output signal will directly represent the desired fore and aft craft acceleration in the horizontal plane independent of fuselage tilt. The outputs of the Doppler velocity meter 47 and of network 21 are combined in an electrical network 44. The outputs of transducer 32 and electrical network 44 are combined in an electrical network 36 with the output voltage of a velocity adjustment potentiometer 33. The outputs of the vertical gyro 18 and transducer 30 are combined in an electrical network 37 with the output voltage of a center of gravity trim adjustment potentiometer 34. The depending limit stop leg 1 of position servo 28 is connected to the movable contact of a single-pole double-throw switch indicated generally by the reference numeral 29. One fixed contact of switch 29 is connected to a source of negative voltage 109. The other fixed contact of switch 29 is connected to a source of positive voltage 110. The fixed contacts of switch 29 are so positioned relative to the limit stops that the movable contact thereof will engage one of the two fixed contacts before the depending leg 1 reaches either limit stop. Mounted on top of the cyclic control stick 2 is the movable spring-centered armature 35 of a single-pole double-throw beeper switch. For purposes of clarity the electrical connections to armature 35 are shown as removed from their physical location. Spring-centered armature 35 may be moved into engagement with one fixed contact, which is connected to the source of positive potential 110, or into the engagement with the other fixed contact, which is connected to the source of negative potential 109. In the position shown armature 35 has been moved into engagement with that contact connected to the source of positive potential 110. A terminal 111 is connected through a switch indicated generally by the reference numeral 43 to one terminal of a relay actuating winding 40, the other terminal of which is grounded. Relay winding 40 controls the armatures of single-pole double-throw relay switches indicated generally by the reference numerals 41 and 42. The contacts of relay switch 41 are connected respectively to spring-centered armature 35 and to the movable contact of switch 29. The output of vertical gyro 18 is connected to the input of a differentiating circuit indicated generally by the reference numeral 38 and comprising a high-gain chopper-stabilized direct-current amplifier having an input capacitor and a feedback resistor. A network 39 combines the output of differentiating circuit 38 and the output of network 37 with the signal at the movable contact of switch 29. The contacts of relay switch 42 are connected respectively to the output of network 39 and the output of network 36. The armature of relay switch 41 is connected to the integrating velocity servo 41. When relay actuating winding 40 is not energized, the armatures of relay switches 41 and 42 normally engage those contacts connected respectively to spring-centered armature 35 and to the output of network 39; and when relay winding 40 is energized, the armatures of switches 41 and 42 are drawn into engagement with those contacts connected respectively to the movable contact of switch 29 and to the output of network 36. The armature of switch 42 is connected to the input of an integrating circuit indicated generally by the reference numeral 26 and comprising a high-gain chopper-stabilized direct-current amplifier having an input resistor and a feedback capacitor. The signal appearing at the armature of switch 42 is combined with the output of integrator 26 in a network 27. The output of network 27 is connected to the position servo 28.

Referring now to the collective channel of FIGURE 1, the pilot's collective pitch lever 52 when moved up and down controls the altitude of the craft. The collective lever 52 is journaled at one end to the craft fuselage and journaled at an intermediate point to a link 53. Link 53 is journaled to an intermediate point of a multiplying linkage 56. One end of linkage 56 is journaled to the input shaft of an hydraulic position servomotor 59. The output shaft 60 of hydraulic servo 59 controls the common or collective pitch 61 of the blades of the lifting rotor or rotors. The other end of linkage 56 is connected to the output shaft 58 of a position servomotor 71. Output shaft 58 is provided with a depending leg 73, which serves as a limit stop. Link 53 is connected through a pilot's feel centering spring 54 to the output shaft 55 of an integrating velocity servomotor 89. The case of a transducer 90 is connected to link 53. The input shaft of transducer 90 is connected to the output shaft 55 of velocity servo 89. Transducer 90 provides an electrical signal proportional to the relative displacement between output shaft 55 and link 53 and hence of the tension or compression in feel centering spring 54. Depending limit stop leg 73 is connected to the movable contact of a single-pole double-throw switch indicated generally by the reference numeral 72. On fixed contact of switch 72 is connected to the source of negative potential 109 and the other fixed contact of switch 72 is connected to the source of positive potential 110. The fixed contacts of switch 72 are so positioned that the movable contact of switch 72 will engage one of the two fixed contacts before leg 73 reaches either limit stop. The movable contact of switch 72 is connected to the integrating velocity servo 89. The craft vertical velocity 62 is proportional to the collective blade pitch 61 because of the damping effect of air flowing through the actuator disk. A barometric rate of climb meter 65 is responsive to the craft's vertical velocity 62. The left-right Doppler section is indicated by the reference numeral 103 and is responsive to the craft vertical velocity 62 relative to the terrain below. As the craft moves downwardly both the left and right horns will receive a frequency higher than that transmitted. The left and right discriminators will produce equal voltages of the same polarity which are summed through an electrical adding network 104, as indicated by the plus signs, to provide an output voltage proportional to vertical velocity. The output of network 104 is connected to a Doppler vertical velocity meter 92. It will be appreciated that because the signals of the left and right horns are added in network 104, vertical velocity meter 92 will not be responsive to sidewards velocities of the craft. Suppose the craft is moving to the left. The left horn will receive a frequency higher than that transmitted while the right horn will receive a frequency less than that transmitted. The left and right discriminators will produce equal voltages of opposite polarity; and the output of network 104 will be zero. Hence the Doppler vertical velocity meter 92 receives a signal proportional to the vertical velocity of the craft independent of any sidewards horizontal motion. Craft altitude 64 is responsive to craft vertical velocity 62, since change in altitude is equal to the integral of vertical velocity. A radio altimeter 93 mounted on the craft fuselage is responsive to craft altitude 64 relative to the terrain below. Radio altimeter 93 may be either a frequency modulation type which cyclically varies the frequency transmitted and detects the maximum deviation in received frequency or a phase modulation type which amplitude modulates the transmitted carrier and detects the phase shift in the modulation envelope of the received carrier. Examples of various types of absolute altimeters are shown and described in the article beginning at page 167 of the May 1944, Proc. I.R.E. A barometric altimeter 67 is also responsive to craft altitude 64 in terms of the standard atmosphere. The output signal of radio altimeter 93 is connected to the input of a differentiating circuit indicated generally by the reference numeral 97 and comprising a chopper-stabilized high-gain direct-current amplifier having an input capacitor and a feedback resistor. The output signal of the radio altimeter 93 is combined in an electrical summing network 95 with the output voltage of an altitude adjustment potentiometer 94. The output of network 95 is connected to the input of a limiter circuit 96. The output signal of barometric altimeter 67 is connected to the input of a limiter circuit 68. The source of positive potential 110 is connected through a switch 115 to a terminal 112. Terminal 112 supplies power to the fore-and-aft Doppler radar section 45, to the left-right Doppler section 103 and to the radio altimeter 93. Terminal 112 also supplies power to a timing circuit 98. Timing circuit 98, which may be either of the bimetallic thermal type or of the mechanical escapement type, controls timer switches indicated generally by the reference numerals 99, 100, and 101. Terminal 112 is connected to the contact of single-throw timer switch 99. The armature of single-throw timer switch 99 is connected to the terminal 111. The output of the barometric rate of climb meter 65 is connected to one contact of each of double-throw timer switches 100 and 101. The output of the Doppler velocity meter 92 is connected to the other contact of timer switch 100; and the output of differentiating circuit 97 is connected to the other contact of timer switch 101. The output of the barometric rate of climb meter 65 is connected to a first contact of a three-position switch indicated generally by the reference numeral 102. The armature of timer switch 100 is connected to a second contact of switch 102. The armature of timer switch 101 is connected to the third contact of the three-position switch 102. Timer switch 99 is normally open; and the armatures of timer switches 100 and 101 normally engage those contacts connected to the output of the barometric rate of climb meter 65. Hence the armature of three-position switch 102 is normally connected to the output of the barometric rate of climb meter 65 regardless of which of the three contacts the armature engages. Terminal 111 is connected through a switch indicated generally by the reference numeral 88 to one terminal of a relay actuating winding 80, the other terminal of which is grounded. Relay winding 80 controls the armature of a single-pole double-throw relay switch indicated generally by the reference numeral 81. The outputs of limiters 68 and 96 are connected respectively to the two contacts of relay switch 81. An electrical network 75 combines the output voltage of transducer 90, the voltage appearing at the armature of switch 102, and the output voltage of a rate of climb adjustment potentiometer 74. The output shaft 55 of velocity servo 89 is connected to one contact of a switch indicated generally by the reference numeral 78. Switch 78 is normally closed; but any motion by the pilot of the collective stick 52 against the feel centering spring 54 will cause switch 78 to open. The actuating member of the rate of climb adjustment potentiometer 74 is mechanically connected to one contact of a normally closed switch 79. Any motion of the rate of climb adjustment potentiometer 74 from its zero position causes switch 79 to open. The source of positive potential 110 is connected serially through switches 78 and 79 to one terminal of a relay actuating winding 83, the other terminal of which is grounded. Winding 83 controls a pair of single-pole double-throw relay switches indicated generally by the reference numerals 84 and 84a. The voltage appearing at the armature of relay switch 81 and the output of the barometric rate of climb meter 65 are combined in an electrical network 85. The two contacts of relay switch 84 are connected respectively to the output of network 75 and the output of network 85. As will be appreciated by those skilled in the art, the output of the barometric altimeter 67 is provided by a pickoff, one element of which is mounted on the pressure sensitive bellows and the other element of which is mounted on the case. An altitude servomotor 66 drives the case-mounted pickoff of the barometric altimeter 67. By means of a spring centered switch 63, similar to the pitch beeper switch 35, the pilot may apply positive or negative voltage to one contact of relay switch 84a. The output signal of barometric altimeter 67 is connected to the second contact of relay switch 84a. The arm of relay switch 84a is connected to the input of altitude servomotor 66. When relay winding 83 is energized, altitude servomotor 66 is rendered responsive to switch 63 and unresponsive to the output of barometric altimeter 67. When winding 83 is not energized (as in the position shown), altitude servomotor 66 is rendered responsive to the spring centered switch 63. Thus, when relay winding 83 is not energized, altitude servomotor 66 is forced to drive the case mounted element of the pickoff until the output error signal of barometric altimeter 67 is zero. When relay winding 83 is energized, the armature of relay switch 84a moves upwardly; and altitude error signals can be generated, since the case mounted element of the pickoff remains stationary, unless the pilot commands a change in altitude by actuating switch 63, causing the altitude servomotor 66 to reposition the case mounted element of the barometric altimeter 67. A tachometer 76 provides an output voltage proportional to the speed of the main rotor. The output of tachometer 76 is connected to a hysteresis circuit 77. Hysteresis circuit 77 has the characteristic of producing no output voltage over a certain range of input voltage and then producing an output voltage proportional to input voltage in regions outside this range. The output of hysteresis circuit 77 and the voltage appearing at the armature of relay switch 84 are electrically combined in a network 82. The output of network 82 is connected to the input of an integrator indicated generally by the reference numeral 69 and comprising a high-gain chopper-stabilized direct-current amplifier having an input resistor and a feedback capacitor. The outputs of integrator 69 and network 82 are combined in an electrical network 70, the output of which is connected to position servo 71. When relay winding is not energized, the armature of relay switch 81 is normally connected to the output of barometric altimeter limiter 68. When relay winding 83 is not energized the armature of relay switch 84 is normally connected to the output of electrical network 75. When winding 80 is energized the armature of switch 81 is drawn into engagement with that contact connected to the output of radio altimeter limiter 96; and when winding 83 is energized the armature of switch 84 is drawn into engagement with that contact connected to the output of network 85.

Referring now to the roll channel of FIGURE 2, the pilot's cyclic stick 2 also, when moved left and right, controls the roll of the craft. The cyclic stick 2 is also journaled at an intermediate point to a link 123. Link 123 is journaled to an intermediate point of a multiplying linkage 126. One end of mupltiplying link 126 is journaled to the input shaft 127 of a hydraulic position servomotor 129. The output shaft 130 of hydraulic position servo 129 operates the swash plate roll cyclic control 131. The other end of multiplying link 126 is connected to the output shaft 128 of a position servomotor 148. Link 123 is connected through a pilot's feel centering spring 124 to the output shaft 125 of an integrating velocity servomotor 151. The case of a transducer 152 is connected to link 123; and the input shaft of transducer 152 is connected to the velocity servo output shaft 125. Thus transducer 152 provides an electrical output signal proportional to the relative motion between link 123 and output shaft 125 and hence proportional to the tension or compression in feel centering spring 124. A depending leg 164 on position servo output shaft 128 provides limit stops for the position servo 148. Depending limit stop leg 164 is connected to the movable contact of a single-pole double-throw switch indicated generally by the reference numeral 149. The fixed contacts of switch 149 are connected respectively to the source of positive potential 110 and the source of negative potential 109 and are so disposed that they will be engaged by the movable contact before leg 164 reaches a limit stop. The movable contact of switch 149 is connected to the velocity servo 151. Movements of the swash plate roll cyclic control 131 cause a resultant roll tilt in the rotor lift vector 132 until the plane of the rotor 132 approximates that of the swash plate 131. The main rotor drive shaft tends to align itself with the lift vector, and hence fuselage tilt 135 is shown responsive to the rotor tilt 132. The craft velocity 144 and the craft acceleration 145 are responsive to rotor tilt 132 relative to the horizon. The rotor tilt 132 relative to the horizon has an immediate effect on the craft acceleration 145. Rotor tilt 132 relative to the horizon has a delayed effect upon craft velocity 144. For the roll channel, as in the pitch channel, a step function in rotor tilt 132 will cause a craft acceleration which decays exponentially to zero and will cause a craft velocity which will rise exponentially to its steady state value. Because of the damping effect of air moving with a component normal to the plane of the rotor, as the craft acceleration 145 approaches zero, the craft velocity 144 approaches its steady state value. It will be appreciated that in the roll channel of FIGURE 2, rotor tilt 132 and fuselage tilt 135 are measured about the roll axis relative to the horizon. Also craft velocity 144 and craft acceleration 145 are measured in the horizontal plane in a direction parallel to the athwartship axis of the craft. The pendulous, gravity-erected vertical gyroscope is also provided with a roll pickoff 138 which generates an electrical output signal proportional to the fuselage tilt in roll 135 relative to the horizon. An accelerometer 140 mounted on the fuselage provides an output signal proportional not only to left-right craft acceleration 145 but also to the fuselage tilt 135 relative to the horizon. The accelerometer 140 is mounted so that its sensing element moves parallel to the athwartship axis of the craft. The output signals of the accelerometer 140 and the vertical gyro 138 are electrically combined in a network 141 such that the output of network 141 is proportional only to craft acceleration 145 and independent of fuselage tilt 135. Again it will be noted that if accelerometer 140 is mounted on the vertical gyro 138, then its output will represent the desired acceleration in the horizontal plane independent of fuselage tilt. The left-right Doppler radar section 103 is also responsive to the craft horizontal velocity 144 relative to the terrain below. If the craft is moving to the left, the frequency received by the left horn will be higher than that transmitted, while the frequency received by the right horn will be less than that transmitted. The left and right discriminators will produce equal voltages of opposite polarity which are differentially combined through a subtraction network 166 as indicated by the plus and minus signs. The output of subtraction network 166 is connected to the input of a Doppler sidewards velocity meter 167. Sidewards velocity meter 167 will not be responsive to vertical craft motions. Suppose the craft is descending. Both left and right horns will receive frequencies higher than transmitted. The left and right discriminators will produce equal voltages of the same polarity; and the output of subtraction network 166 will be zero. One example of a Doppler system substantially as described herein is shown in Patent No. 2,866,190, issued on an application filed June 1, 1956. The output of accelerometer network 141 and the output of the Doppler velocity meter 167 are combined in a network 165. Terminal 111 is connected through a switch indicated generally by the reference numeral 163 to one terminal of relay actuating winding 160, the other terminal of which is grounded. Winding 160 controls relay switches indicated generally by the reference numerals 161 and 162. The output voltage of a rate of turn or velocity adjustment potentiometer 153 is combined with the output voltage of transducer 152 and with the signal at the armature of switch 162 in a network 156. The roll output signal of the vertical gyro 138 is connected to the input of a differentiating circuit indicated generally by the reference numeral 158 and comprising a high-gain chopper-stabilized direct-current amplifier having an input capacitor and a feedback resistor. The output voltages of the differentiating circuit 158 and the vertical gyro 138 are combined in a network 159. The contacts of relay switch 162 are connected respectively to the outputs of networks 159 and 165. The source of positive potential 110 is connected serially through a switch 154 and a switch 155 to the armature of relay switch 161. One contact of switch 154 is connected to the output shaft 125 of velocity servo 151; the other contact of switch 154 is connected to link 123. Switch 154 is normally closed; but any pilot's left-right motion of the cyclic stick 2 will cause switch 154 to open. One contact of switch 155 is mechanically connected to the actuating member of rate of turn or velocity adjustment potentiometer 153. Switch 155 is normally closed; but any motion by the pilot of potentiometer 153 from its zero position will cause switch 155 to open. The output of network 156 is connected to the input of an integrating circuit indicated generally by the reference numeral 146 and comprising a high-gain chopper-stabilized direct-current amplifier having an input resistor and a feedback capacitor. The signals appearing at the output of integrating circuit 146 and at the output of network 156 are electrically combined through a network 147, the output of which is connected to position servo 148.

Referring now to the yaw channel of FIGURE 2, the pilot's rudder pedals control 182 is journaled to the fuselage and also to a link 183. Link 183 is journaled to an intermediate point of a multiplying linkage 186. One end of multiplying link 186 is connected to the input shaft 187 of a hydraulic position servo 189. The output shaft 190 of hydraulic position servo 189 controls the pitch of the tail torque rotor 191. It will be appreciated that while I have shown a flight control system for use in helicopters having a single sustaining rotor with an anti-torque tail rotor, my system is equally adapted for use in helicopters having a plurality of lifting rotors disposed either in a tandem or a coaxial configuration. The other end of multiplying link 186 is journaled to the output shaft 188 of a position servomotor 202. Link 183 is connected through a pilot's feel centering spring 184 to the output shaft 185 of an integrating or velocity servomotor 206. A hydraulic dashpot damper 193 is also provided with its cylinder connected to velocity servo output shaft 185 and its piston connected to link 183. The output shaft 188 of position servo 202 is provided with a depending leg 203 which serves as a limit stop. Depending limit stop leg 203 is connected to the movable contact of a single-pole double-throw switch indicated generally by the reference numeral 204. The two fixed contacts of switch 204 are connected respectively to the source of positive potential 110 and to the source of negative potential 109. The fixed contacts of switch 204 are so disposed that the movable contact will engage one of the fixed contacts before depending leg 203 reaches either limit stop. The movable contact of switch 204 is connected to the velocity servo 206. The craft rate of turn 192 is responsive to tail rotor blade pitch 191 because of air damping. The craft heading 194 is responsive to the craft rate of turn 192, since change in heading is equal to the integral of rate of turn. A remote flux-gate gyro compass 195 attached to the fuselage provides an output signal representing the deviation in craft heading 194 from a desired heading. A rate of turn gyroscope 197, mounted on the fuselage, is responsive to the craft rate of turn 192. The output of the flux-gate gyro compass 195 is applied to the input of a limiter circuit 198. The case of a transducer 205 is connected to link 183; and the input shaft of transducer 205 is connected to velocity servo output shaft 185. Transducer 205 provides an electrical output signal proportional to the resultant motion between link 183 and velocity servo output shaft 185 and hence proportional to the tension or compression in the feel centering spring 184. The outputs of the vertical gyro roll pickoff 138 and of the yaw transducer 205 and of the roll accelerometer 140 are electrically combined in a network 208. The contact of relay switch 161 is connected through a switch indicated generally by the reference numeral 207 to one terminal of a relay actuating winding 209, the other terminal of which is grounded. Relay winding 209 controls a pair of single-pole double-throw relay switches indicated generally by the reference numerals 210 and 210a. When relay winding 160 is not energized, the armature of relay switch 161 normally engages the contact thereof; and the armature of relay switch 162 normally engages that contact connected to the output of network 159. One contact of switch 207 is connected to the velocity servo output shaft 185; and the other contact of switch 207 is connected to link 183. Switch 207 is normally closed; but any motion of the rudder pedals 182, causing a tension or compression in feel centering spring 184, will cause switch 207 to open. The contacts of relay switch 210 are connected respectively to the output of network 208 and the output of limiter 198. The signal appearing at the armature of relay switch 210 is combined with the output signal of the rate of turn gyro 197 in a network 199. The output of network 199 is connected to the input of an integrating circuit indicated generally by the reference numeral 200 and comprising a high-gain chopper-stabilized direct-current amplifier having an input resistor and a feedback capacitor. The signals appearing at the outputs of integrator 200 and of network 199 are electrically combined in a network 201, the output of which is connected to position servo 202. As will be appreciated by those skilled in the art, the remote compass 195 produces an output signal from a pickoff, one element of which is mounted on the cage of the gyro and the other element of which is mounted on the case. A heading servomotor 196 drives the case-mounted pickoff of the remote flux-gate gyro compass 195. One contact of relay switch 210a is connected to the output of limiter 198. The other contact of relay switch 210a is connected to the armature of a spring centered switch 212 which is similar to the pitch beeper switch 35 and to the altitude adjustment switch 63. One contact of switch 212 is connected to the source of positive potential 110 and the other contact of switch 212 is connected to the source of negative potential 109. The armature of relay switch 210a is connected to the heading servomotor 196. The operation of the heading servomotor 196 for the yaw channel is similar to that of the altitude servomotor for the collective channel. When relay winding 209 is not energized (as in the position shown), heading servomotor 196 is forced to drive the case mounted element of the gyro compass pickoff until the error signal of the gyro compass 195 is zero. When relay winding 209 is energized, heading error signals can be generated, since the case mounted pickoff element of the gyro compass turns with the craft, unless the pilot commands a change in heading by actuating switch 212.

It will be appreciated that I have shown my flight control system instrumented on a direct-current basis. Direct current is required, however, only for integrator 26 and differentiator 38 of the pitch channel, for integrator 69 and differentiator 97 of the collective channel, for integrator 146 and differentiator 158 of the roll channel, and for integrator 200 of the yaw channel. For all other components the system may, with equal advantage, be instrumented on an alternating-current basis. As will be understood by those skilled in the art, where my system is partially instrumented on an alternating-current basis, then phase-sensitive modulators and demodulators will be required at appropriate points for the differentiators and integrators. For example, in the yaw channel, if the inputs to network 199 are alternating current, then network 199 must include a phase-sensitive demodulator to convert its alternating-current output voltage into a direct-current signal of a proportional magnitude and an appropriate polarity; and if position servo 202 operates on alternating current, then network 201 must include a phase-sensitive modulator to convert its direct-current output voltage into an alternating-current signal of a proportional magnitude and an appropriate polarity.

As shown by Gerstenberger et al., each of position servomotors 28, 71, 148, and 202 incorporates a position follow-up transducer providing a signal proportional to displacement of the servo output shaft. The servo input signal is compared with the follow-up signal; and the error voltage causes the servomotor to be driven until input and follow-up voltages correspond. Thus the servo output shaft is positioned in correspondence with the input voltage. In order to damp excessive overshoot or oscillation, each of the position servomotors also incorporates a tachometer rate generator the output signal of which is combined with the error voltage to drive the servomotor. The rate generator damping may be adjusted to slightly less than critical so that the frequency response curve exhibits a slight peak and there is a slight overshoot in response to step function inputs.

Each of velocity servomotors 31, 89, 151, and 206 may comprise a simple servomotor which rotates at a speed approximately proportional to input voltages. It is not required that there be good linearity between input voltage and speed of rotation for these integrating velocity servos. Hence there is no need to provide the tachometer rate generator feedback which would be required were linearity in velocity of importance. As will be appreciated by those skilled in the art, the integrating action afforded by a velocity servo may be achieved, with equal advantage, by instead providing a beeper or stepping-switch motor which may have an actuating frequency of, for example, one beep or step for each two-second period. As shown by Gerstenberger et al., the integrating action afforded by an electrical velocity servo may also be achieved by instead providing spring stops for the input valve of a hydraulic position servo so that the fluid flow cannot be cut off. Thus the hydraulic position servo is converted into an integrating velocity servo whose output shaft moves at a certain rate or velocity carrying the input shaft along with it.

Each of the electrical networks, such as networks 36 and 37, may comprise passive resistance combining circuits or active summing amplifier circuits where signals are to be added. Where signals are to be subtracted, then such networks may comprise differential amplifiers or may include inverting amplifiers for those inputs to be subtracted.

My flight control system is adapted to operate in two distinct modes, one being the stabilization mode, and the other being the hovering mode.

In operation of my flight control system in the stabilization mode of the pitch channel, the output voltage of transducer 30, which measures the absolute position of the pilot's cyclic stick 2 in pitch, is compared with the pitch output 18 of the vertical gyro. Thus in the stabilization mode the absolute position of the pilot's stick 2 in pitch causes a corresponding fuselage tilt 15. Because fuselage tilt 15 and rotor tilt 12 tend towards correspondence and since rotor tilt 12 relative to the horizon is proportional to airspeed 24, the pitch output 18 of the vertical gyro is substantially proportional to the airspeed 24 of the craft. Thus because of the comparison of the absolute position of the pilot's cyclic stick in pitch with fuselage tilt, through components 30 and 18, the position of the cyclic stick in pitch is proportional not only to fuselage tilt but also to rotor tilt relative to the horizon and hence to the forward airspeed of the craft. Assume for the moment that the craft center of gravity coincides with the main rotor drive shaft and that the airspeed is zero. In such event there will be no fuselage tilt 15 relative to the horizon; and the pitch output of vertical gyro 18 will be zero. And because the airspeed is zero, there will be no rotor tilt 12 relative to the horizon. The pilot's stick 2 will be neutrally positioned so that the swash plate cyclic control 11 is also substantially horizontal. The system is adjusted so that under these conditions the output of transducer 30 is zero when the position servo output shaft 8 is located such that the depending leg 1 is intermediate its limit stops. Now if owing to changes in load the center of gravity is shifted aft, for example, the fuselage will tilt upwardly causing a signal from the vertical gyro 18. A forward tilt of the cyclic control 11 will be required to maintain the plane of the rotor coincident with the horizon so that the airspeed remains zero. This forward motion of the cyclic control 11 is produced by a movement of the position servo output shaft 8; and depending leg 1 will now approach one of the two limit stops. The center of gravity trim adjustment potentiometer 34 provides a voltage so that the depending leg 1 of the position servo may be located intermediate the limit stops under all variations of center of gravity location. With a center of gravity aft the main rotor drive shaft and the depending leg 1 positioned intermediate the limit stops in order to maintain zero airspeed, the cyclic stick 2 must be moved forward. Such motion of the stick 2 will cause a signal from transducer 30. Thus the center of gravity trim adjustment potentiometer 34 must be moved from its zero position to supply an opposite polarity voltage equal to the sum of the voltages produced by the pitch pickoff 18 of the vertical gyro and by transducer 30. The center of gravity trim adjustment potentiometer 34 may be positioned either explicitly, according to the particular loading conditions which every pilot calculates for his craft, or implicitly, by causing the output of summing network 27 to become zero. In the stabilization mode relay winding 40 is not energized; and the armature of switch 42 engages that contact connected to the output of network 39. Differentiator 38 provides damping for the system. The gains of components 18 and 30 and the time-constant of differentiator 38 should be adjusted so that for a step function in absolute position of the pilot's stick 2, accompanied by a step change in the output of transducer 30 and by a step change in rotor tilt 12 and by an exponential change both in fuselage tilt 15 and in vertical gyro output 18, differentiator 38 will produce a step function decaying exponential voltage which when added to the vertical gyro output 18 will be equal and opposite to the voltage produced by transducer 30, so that the output of network 39 remains substantially zero and output shaft 8 of position servo 28 will not move. This adjustment of the time-constant of differentiator 38 produces damping slightly greater than critical so that the craft approaches the pitch attitude commanded by the absolute position of the pilot's stick 2 in a deadbeat manner with no overshoot. Since the position servo 28 for these adjustments does not move, the craft response closed loop will be substantially the same as open loop were the system disconnected. Position servo 28 is called upon to produce only the slight corrections required to maintain the commanded attitude which may be occasioned by wind gusts or other transients. It will be appreciated that the damping signal afforded by differentiator 38 might, with equal advantage, be obtained from a rate gyro sensitive to motions in the pitch plane; but since the vertical gyro 18 provides proportional signals for wide pitch changes with good linearity, the differentiation of such signal by means 38 affords a cheaper and more reliable expedient than would the use of a rate gyro. Presumably, if the setting of the center of gravity trim adjustment potentiometer 34 is proper, the output shaft 8 of position servo 28 would remain positioned intermediate its limit stops at all airspeeds and hence at any fuselage tilt 15 relative to the horizon. However, because of some nonlinearity in the gradient between the position of cyclic stick 2 and the resulting fuselage tilt 15 as indicated by the vertical gyro 18, output shaft 8 of position servo 28 will be required to move slightly from its zero position over a complete flight regime from full speed to hover. Other nonlinearities are produced by fuselage drag and by the horizontal tail surfaces usually provided for dynamic stability in pitch. Integrator 26 causes the zero frequency gain of the system to be substantially infinite. Hence integrator 26 accommodates this slight change from zero position of output shaft 8 over the complete speed range in the flight regime while permitting the output error signal of network 39 to be precisely zero. As mentioned hereinabove, position servo 28 includes a follow-up transducer. In order for the position servomotor 28 to remain displaced from its null position there must exist a continuing output signal from network 27. If there exists an output error signal from network 39, no matter how small, the output of integrator 26 will build up. The output of network 39 will return exponentially to zero. The output of integrator 26, through network 27, supports the entire voltage to position servomotor 28 which is required to maintain the motor 28 displaced from its null position. The pilot has two methods of changing the fuselage tilt 15 and hence the airspeed of the craft. One method is to continuously hold the cyclic stick 2 in the desired position against the pilot's feel spring 4. The second method, which would be used for long range cruising, is to move the spring-centered armature 35 forward causing a signal of an appropriate polarity to be applied to the armature of switch 41 and thence to velocity servo 31 to position its output shaft 5 and hence spring 4 so that the pilot's stick 2 will remain in the desired position without the necessity for any sustained pressure. If the adjustment of the center of gravity trim potentiometer 34 is grossly incorrect, then depending leg 1 will hit a limit stop; and the system cannot reach a true null. However, adjacent a limit stop the movable contact of switch 29 engages a fixed contact, causing a voltage to be impressed on network 39 of such polarity that position servo 28 will be driven away from the limit stop. The movable contact of switch 29 will disengage the fixed contact; and position servo 28 will be driven again towards the limit stop. This action prevents integrator 26 from running away to saturation. Position servo 28 will gently oscillate at a limit stop; and the resulting controlled pitch oscillation of the craft will warn the pilot that his center of gravity trim setting is improper. If the pilot cannot set his C.G. potentiometer 34 so that a true null is achieved, then this warns him that the load may have shifted, as by cargo breaking away. It will be appreciated that, rather than applying the signal appearing at the movable contact of switch 29 to network 39, I might instead apply such signal to a servomotor which would automatically reposition C.G. trim potentiometer 34 to achieve a true null. While it is true that such construction would relieve the pilot of the necessity for manually setting the C.G. trim, there would be no warning that center of gravity limits have been approached and exceeded.

In the stabilization mode of the roll channel, the output voltage of transducer 152, which measures the relative tension or compression in centering spring 124, is compared with the roll output 138 of the vertical gyro. In the stabilization mode, relay winding 160 is not energized; and the armature of switch 162 engages that contact connected to the output of network 159. If the rate of turn adjustment 153 is at its neutral or zero position and the pilot exerts no lateral forces on the cyclic stick 2, the craft fuselage will seek and maintain a horizontal position. It will be noted that in the roll channel the absolute position of the pilot's stick 2 is not measured. At zero air speed the pilot's stick is neutrally positioned; but as the forward airspeed rises from zero, a motion of the cyclic control stick 2 will be required to equalize the lift over the actuator disk so that advancing blades have a less than normal angle of attack. For air-driven rotors, such as in autogyros or in helicopters during autorotation, the use of articulated rotor blades permits of flapping to equalize the lift over the actuator disk, which causes a backwards rotor tilt as an advancing blade flaps upwardly and a retreating blade flaps downwardly. But for a powered rotor, requiring a forward tilt to maintain airspeed, there is required a motion of the pilot's cyclic stick in roll from its neutral position as a function of airspeed. Accordingly, the absolute position of the pilot's stick 2 in roll is not simply related to the roll fuselage tilt 135, since in order to maintain the fuselage tilt 135 at zero, the stick must be moved further and further from the neutral position as the airspeed is increased. Hence for the roll channel, the output shaft 128 of position servo 148 cannot remain substantially in its zero position intermediate the limit stops. Assuming that the craft is hovering at zero airspeed, if the pilot moves his stick 2 forward causing the craft to accelerate and the forward velocity to change from zero to maximum, the roll position servo 148 will be required to move from its neutral position towards one limit stop. Because the position servo 148 is only of limited authority and cannot accommodate the large changes required in roll to equalize the lift around the actuator disk, the pilot's cyclic stick 2 must be repositioned in roll. The repositioning of the pilot's stick in roll is accomplished automatically. As output shaft 128 approaches a limit stop, the movable contact of switch 149 first engages one of the two fixed contacts causing an appropriate voltage to be applied to the movable contact and energizing velocity servo 152 to drive its output shaft 125 in a direction to reposition through spring 124 the pilot's stick 2 and hence the cyclic control 131 until the position servo output shaft 128 moves away from such limit stop an amount sufficient for the movable contact of switch 149 to disengage the fixed contact thereof. Thus the pilot need make no corrections to the roll channel over a complete flight regime ranging from full speed forward to hover. There are two ways in which the pilot may command a roll fuselage tilt 135. Firstly, the pilot may maintain a pressure on the control stick 2 to produce a tension or compression in spring 124 and hence a positive or negative output of transducer 152. Secondly, the pilot may move his rate of turn adjustment potentiometer 153 in a plus or minus direction from its zero position. Either of these motions will introduce a signal into network 156 which will require a change in the roll output 138 of the vertical gyro. Again differentiator 158 provides a damping signal. For a step function change of voltage from either the rate of turn potentiometer 153 or the spring tension or compression transducer 152, the resulting exponential change in fuselage tilt 135, as measured by the vertical gyro 138, will be differentiated by means 158 to produce a voltage which, when combined with the output of vertical gyro 138, will be equal and opposite so that the output of network 156 remains substantially zero and position servo 148 will not move. Again a rate gyro could be substituted for differentiator 158 but the configuration as shown is less expensive and more reliable. Thus the time-constant of differentiator 158 is adjusted to produce damping at least critical and even slightly greater than critical so that, if the airspeed remains constant, for a step function in roll command, the fuselage tilt 135 will exponentially approach the commanded position without the necessity of appreciable motion of position servo output shaft 128. Thus for constant airspeed the gains of the various components are adjusted such that the output of network 156 remains substantially zero; and the craft response closed loop is substantially the same as open loop were the system disconnected. Integrator 146 provides an infinite gain at zero frequency and permits of an exact positioning of output shaft 128 for the required changes in the cyclic control 131 with changes in the forward airspeed of the craft. While in the pitch channel; integrator 26 improves the system response somewhat, it is not so important because of the fact that output shaft 8 does tend to operate about its zero position if the C.G. trim adjustment potentiometer 34 is properly set. But in the roll channel, integrator 146 is significantly more important because of the fact that output shaft 128 of position servo 148 will be required to operate from limit stop to limit stop to reposition the output shaft 125 of velocity servo 151 in accordance with changes in airspeed and equalize the lift over the actuator disk.

In operation of the yaw channel in the stabilization mode, relay winding 160 is not energized; and relay contact 161 is closed. If the pilot is exerting no pressures on his stick 2 in roll and if the rate of turn adjustment potentiometer 153 is at its zero position and if the pilot is exerting no pressures on his rudder pedals 182, then switches 154, 155, and 207 will be closed, causing positive voltage 110 to energize relay winding 209, drawing the armature of switch 210 into engagement with the output of limiter 198. The craft is thus locked to a heading as determined by the flux-gate gyro compass 195. The energization of winding 209 also actuates switch 210a rendering heading servomotor 196 unresponsive to the output of the remote compass 195 so that the case-mounted pickoff turns with the craft and causes output signals to be produced in accordance with an error from the commanded heading. The case-mounted pickoff of the gyrocompass 195 may now be repositioned only by manually operating the spring-centered switch 212. For a large change in position of the case-mounted pickoff, and hence a large change in the commanded heading, the craft will be forced to sneak to such heading in an uncoordinated skid, without roll or bank, at a predetermined rate of, for example, between one and three degrees per second. This predetermined rate of sneak of the desired heading is determined by the setting of maximum voltage permitted by limiter 198 and by the voltage proportionality constant of the rate of turn gyro 197. At the pre-set rate of sneak, the outputs of limiter 198 and rate of turn gyro 197 will be equal and opposite; and the output voltage of network 199 will be zero. As the error from the desired heading approaches zero, the craft rate of turn 192 will be forced to also approach zero so that at all times the output signal of the rate of turn gyro 197 is substantially equal and opposite to that of the limiter 198; and the output of network 199 remains substantially zero. Because there is no coupling to the roll channel, the turn is uncoordinated, being a skidding maneuver. Hence the rate of turn for large errors in heading must be limited to avoid undue structural stress, loss in forward speed, and passenger discomfort. It will be noted that in the yaw channel, as in the roll channel, in contradistinction to the pitch channel, transducer 205 provides a signal proportional only to the tension or compression in the pilot's feel centering spring 184 and not to the absolute position of the rudder pedals 182. It will be appreciated that there is no predetermined relationship between rate of turn and the absolute position of the pilot's rudder pedals 182. When the main rotor absorbs torque from the power plant, the tail rotor blade pitch 191 must be increased to compensate for this torque. When the main rotor is in autorotation, being air driven and receiving no torque from the power plant, then the tail blade rotor pitch 191 must be reduced to zero if the rate of turn is to be held at zero. Consequently, it is only during autorotation that the tail rotor blade pitch 191 and the craft rate of turn 192 bear a corresponding relationship. If a large change in power is occasioned as to accommodate a climb or descent, then the craft will begin to turn from its commanded heading. The gyro compass 195 and the rate of turn gyro 197 will produce output signals; and the output shaft 188 of position servo 202 will move towards one or the other of the two limit stops; but before the depending leg 203 reaches either limit stop, the movable contact of switch 204 will engage one or the other of the two fixed contacts and apply a signal to the movable contact of switch 204.

Velocity servo 206 will be driven to reposition its output shaft 185 and, through spring 184, the pilot's rudder pedals 182 until the position servo output shaft 188 lies within the limits determined by the two fixed contacts of switch 204. The craft will return to the commanded heading where the outputs of gyro compass 195 and of rate of turn gyro 197 become zero. In the yaw channel integrator 200 is of importance since position servo 202 will be required to operate, not merely about its zero position, but from limit stop to limit stop. If no changes in power setting are required and the craft maintains constant altitude and constant airspeed, then to accommodate a change in commanded heading by the actuation of switch 212, the output shaft of position servo 188 will be required to move from its initial position an amount proportional to the desired rate of sneak according to the setting on limiter 198 and will then, as the error signal from gyro compass 195 approaches zero, exponentially return to its initial position. The damping effect of the rate of turn gyro 197 prevents overshoot in the craft's approaching and retaining the commanded heading. The pilot can command a similar skidding or uncoordinated turn to a new heading by a movement of rudder pedals 182. If the pilot exerts pressure on rudder pedals 182, switch 207 will open, relay winding 209 will become de-energized, and the armature of switch 210 will disengage that contact connected to the output of limiter 198 and engage that contact connected to the output of network 208. Transducer 205 generates an output signal which is proportional to the pilot's pressure on rudder pedals 182 and which is impressed on network 208. One input to network 208 comprises the output of roll accelerometer 140. Since roll accelerometer is mounted on the fuselage, it provides a signal proportional to the amount of skid. Thus the craft will be forced into such rate of turn 192 that the resulting centrifugal force causes the output signal of accelerometer 140 to be equal and opposite to the output signal of transducer 205. The gains of components 140 and 205 should be adjusted such that for craft rates of turn commanded solely by movements of rudder pedals 182, the output of network 208 remains substantially zero and position servo 202 remains substantially stationary. This setting of gains will produce a closed loop response identical to the open loop response were the system disconnected. Since centrifugal force is equal to the product of rate of turn and airspeed and since change in tail rotor blade pitch is substantially equal to the product of rate of turn and airspeed, a setting for the gains of components 205 and 140 correct at one airspeed will be correct for all airspeeds in the flight regime except airspeeds approaching zero. The rudder pedal feel centering spring 184 should preferably be fairly stiff. With the provision of a stiff centering spring 184 and an hydraulic damper 193, the pilot will feel considerable foot pressures in performing an uncoordinated or skidding turn so that undue craft stresses will not be set up without their realization by the pilot in the pedal forces he must exert. The de-energization of relay winding 209 also causes the heading servomotor 196 to reposition the case-mounted pickoff element of the flux-gate gyro compass 195 in accordance with its output error signal. Thus when the pilot removes foot pressure from the rudder pedals 182, switch 207 will close, causing winding 209 to pull armature 210 into engagement with the output of the remote compass 195, and disabling the heading servomotor 196 so that the craft will seek and maintain the new heading commanded by the pilot. Coordinated turns to a new heading may be accomplished through motion of either of two controls. Firstly, the pilot may move his cyclic stick 2 in roll. Secondly, the pilot may rotate his rate of turn adjustment potentiometer 153 from its zero position. The motion of either of these controls, as has been previously explained, will cause a fuselage tilt 135, accompanied by an output signal from roll accelerometer 140. If the pilot moves his cyclic stick 2, then switch 154 will open. If the pilot moves his rate of turn adjustment potentiometer 153, then switch 155 will open. In either event, winding 209 will become deenergized; and the armature of switch 210 will be rendered responsive to the output of network 208. One input to network 208 comprises the output signal of roll accelerometer 140. Since roll accelerometer 140 is mounted on the fuselage, it provides an output signal proportional to slip and skid and is therefore responsive to uncoordinated maneuvers. Thus the craft will be forced into such rate of turn 192 that the resulting centrifugal force causes the output of accelerometer 140 to return to zero. Because of the coupling of roll accelerometer 140 into the yaw channel, the resulting turn must be coordinated. Any slip or skid will cause an output signal from accelerometer 140 which will result in a change in tail rotor blade pitch 191 and a change in craft rate of turn 192 until the turn is precisely coordinated. Thus I may produce coordinated turns for all airspeeds in the flight regime except airspeeds approaching zero. Again the opening of either of switches 154 or 155, de-energizes relay winding 209, causing the case mounted pickoff of the gyro compass 195 to be repositioned so that when the pilot releases pressure on the cyclic stick 2 or returns his rate of turn adjustment potentiometer 153 to zero closing switches 154 and 155, the craft will seek and maintain the heading which existed at such time. It will be noted that the coupling of the roll channel accelerometer into the yaw channel gives desirable characteristics for all airspeeds except those approaching zero. For skidding turns commanded solely by movement of the rudder pedal 182, the response closed loop may be made identical to the response open loop by proper relative gain adjustments; and turns commanded by movement of either the roll cyclic stick 2 or the rate of turn potentiometer 153 will be precisely coordinated. But a problem arises as airspeeds approach zero. At zero airspeed the output of roll accelerometer 140 is not responsive to craft rate of turn, since no centrifugal force can be developed. Accordingly at zero airspeed the yaw channel integrator 200 would tend to run away to saturation, because the system could not be nulled in response to movement of either the roll cyclic stick 2 or the turn potentiometer 153 or the rudder pedals 182. Hence some other craft motion feedback must be used which will be responsive to rate of turn at zero airspeed. The output of the rate of turn gyro 197 is independent of airspeed and is accordingly coupled to network 208. In order that turns commanded by movements of either of the roll channel controls 2 and 153 remains coordinated, the roll output 138 of the vertical gyro or gyro horizon is also coupled to network 208. For the usual cruising airspeeds of helicopters, the angle of bank for a coordinated standard rate 3° per second turn is approximately 15°. The gains of the components 138 and 197 are adjusted so that for a 15° bank and approximately a 3° per second rate of turn, equal and opposite voltages are coupled to network 208. Thus at the cruising airspeed, the output of accelerometer 140 will be zero; and turns will be precisely coordinated. This adjustment for the gains of components 138 and 197 will be correct at only one airspeed however. For airspeeds above or below cruising, some slight skid or slip will be present. However, accelerometer 140, being responsive to such lack of coordination, will tend to reduce the error sufficiently that the average pilot will rarely feel the need to apply top or bottom rudder pressure to pedals 182. Thus rate gyro 197 enables the yaw channel to null at zero airspeed where accelerometer 140 is ineffective; and the roll signal 138 of the gyro horizon compensates for the signal of rate gyro 138 so that precisely coordinated turns are automatically secured at least for cruising airspeeds. With the introduction of the signal of the rate gyro 197 into network 208, the closed loop craft response for skidding turns commanded solely by movement of rudder pedals 182 will be identical to the open loop response at only one airspeed. The gain adjustment of accelerometer 140 may be decreased or that of transducer 205 may be increased from the settings previously specified so that at cruising airspeeds the output signal from transducer 205 is equal and opposite to the sum of the signals from accelerometer 140 and rate gyro 197; and position servo 202 remains stationary. For airspeeds other than cruising, some slight difference will exist between open and closed loop craft response to movements of the rudder pedals 182. However, the average pilot will not be able to detect such slight differences in craft response. In some flight control systems, coordinated turns are commanded through the yaw channel; and the roll channel is forced to maintain the turn coordinated. In my flight control system, for reasons described hereinafter, coordinated turns are commanded in the roll channel; and the yaw channel is forced to maintain the turn coordinated. It will be appreciated that regardless of the position of the armature of relay switch 210, the output of integrator 200 is always responsive to its input; and the system always finds a true null. This null cannot be defeated by any of the pilot's commands; and in seeking a null, the system forces the craft to follow the pilot's commands.

In operation of the collective channel in the stabilization mode, the output error signal of the barometric altimeter 67 is coupled through relay switch 81 to network 85 where it is compared with the output signal of the barometric rate of climb meter 65. If the pilot exerts no forces on his collective stick 52 and if the pilot's rate of climb adjustment potentiometer is at its zero position, then switches 78 and 79 will remain closed with the result that relay winding 83 will be energized and the armature of switch 84 will engage that contact connected to the output of network 85. The craft is thus locked to an altitude determined by the barometric altimeter 67. The energization of relay winding 83 also renders altitude servomotor 66 unresponsive to the output of altimeter 67 so that the case-mounted pickoff element of the barometric altimeter 67 remains stationary, causing output signals to be produced with error from commanded altitude. The case-mounted element of the barometric altimeter 67 may now be repositioned only by manually operating the spring-centered switch which applies positive or negative voltage to servomotor 66 to command a change in altitude. For a large change in the error signal of the barometric altimeter 67, limiter 68 is set to a predetermined level so that a rate of climb will be produced which lies within the usual operating limits of the craft. For example, if the craft altitude is less than the command altitude, the collective blade pitch must be increased which, in turn, will require an increased engine output to maintain the speed of the rotor constant. It is usually not desirable, except under emergency conditions, to produce a rate of climb which would require a maximum engine output. Accordingly, the level of limiter 68 is adjusted so that regardless of how much craft altitude is below the command altitude, a rate of climb will be produced which will require an engine output certainly above normal cruising power but appreciably less than the maximum power of which the engine is capable of developing. Similarly limiter 68 is set so that regardless of how high the craft is above its commanded altitude, the craft rate of descent will not exceed that which would accompany autorotation at the normal rotor speed. Limiter 68 is adjusted to produce predetermined rates of climb or descent, regardless of the actual error in altitude, between 300 and 1,000 feet per minute, for example. As the craft approaches the desired altitude and the output of limiter 68 decreases from either its maximum positive or negative value towards zero, the craft vertical velocity 62 will be forced to decrease so that at all times the outputs of the barometric rate of climb meter 65 and limiter 68 are equal and opposite and the output of network 85 remains substantially zero. The damping afforded by the barometric rate of climb meter 65 causes a dead-beat approach to and retention of the commanded altitude without overshoot or other instability. The pilot can command a predetermined rate of climb or descent in either of two ways. Firstly, the pilot may maintain a pressure on the collective stick 52, causing a tension or compression in feel centering spring 64 and an output from transducer 90. Secondly, the pilot may rotate his rate of climb adjustment potentiometer 74 to introduce either a positive or negative signal into network 75. In either event one of switches 78 and 79 will open, de-energizing winding 83 and permitting armature 84 to engage that contact connected to the output of network 75. Normally the output of the barometric rate of climb meter 65 is connected through timer switches 100 and 101 to each one of the three positions of switch 102. Hence regardless of the positioning of switch 102, the movable contact thereof will receive the output voltage of the barometric rate of climb meter 65. A signal introduced into network 75 from rate of climb adjustment potentiometer 74 will force a change in vertical velocity 62, until an equal and opposite signal appears from the barometric rate of climb meter 65 so that the output signal of network 75 returns to zero and the output shaft 58 of position servo 71 will not be required to move further. The gains of components 90 and 65 should be adjusted such that for rates of climb and descent commanded solely by movement of collective lever 52 the output of network 75 remains substantially zero and position servo 71 remains substantially stationary. This setting of gains causes the closed loop craft response to the collective lever 52 to be identical to the open loop response were the system disconnected. The de-energization of winding 83 causes the altitude servomotor 66 to reposition the case-mounted pickoff of the barometric altimeter 67 in correspondence with the position of the movable aneroid diaphragm responsive pickoff element. When the pilot releases pressure on the collective stick 52 or returns his rate of climb adjustment potentiometer 74 to the zero position, switches 78 and 79 will be closed, energizing winding 83, rendering the armature of contact 84 responsive to the barometric altimeter 67, and disabling the servomotor 66 so that the craft will seek and maintain the altitude existing at such time. It will be noted that in the collective channel, as in the roll and yaw channels, in contradistinction to the pitch channel, transducer 90 generates the signal proportional only to the tension or compression in spring 64 and not to the absolute position of the collective stick 52. In the collective channel there is no predetermined relationship between absolute position of the collective stick 52 and rate of climb. There is a certain helicopter airspeed somewhere in the region between, for example 20 and 40 knots that the power output and hence the blade pitch 61 required to maintain level flight is a minimum. For speeds greater than this the blade pitch 61 must be increased; and for speeds less than this, especially for hovering, the blade pitch 61 must be again increased. Furthermore, with changes in load from full gross weight down to a lightly loaded condition when gas tanks are nearly empty, the blade pitch will change even for constant airspeed and altitude. Finally, with variation in air density the blade pitch 61 will be required to change. The position servo 71 is only of limited authority, and cannot alone accommodate the large changes in blade pitch 61 required throughout a complete flight regime. As the depending leg 73 of the output shaft 58 of position servo 71 approaches one of its two limit stops, the movable contact of switch 72 will first engage one of the two fixed contacts thereof, causing a signal to be applied to velocity servo 89. The velocity servo output shaft 55 moves at a certain rate and, through centering spring 54, repositions the pilot's collective stick 52, changing the collective blade pitch 61, until the position servo output shaft 58 is driven away from one of the two limit stops and operates within its region of authority. In the event of engine failure, it is absolutely essential that the blade pitch 61 be reduced sufficiently to permit the rotor to auto-rotate at a sufficient speed that the lifting blades will neither stall nor collapse upwardly due to decreased centrifugal force. All pilot's commands inconsistent with a reduction in blade pitch 61 must be ignored or overridden. If either through a loss in engine power or through a combination of commands from rate of climb adjustment potentiometer 74 and transducer 90, the blade pitch 61 is too high for the maximum available engine power, then the speed of main rotor will begin to decrease from its normal operating value. The output voltage of the rotor tachometer 76 will likewise decrease. Hysteresis circuit 77 is adjusted so that when the output voltage of tachometer 76 is less than a predetermined level, a signal will be coupled to network 82. This signal from hysteresis circuit 77 is applied with sufficient gain to substantially overpower any commands inconsistent with a reduction in blade pitch 61 which may appear at the armature of switch 84. The output signal of network 82 will now cause position servo 71 to reduce the blade pitch 61, causing rotor speed to increase until now the rotor tachometer 76 generates a voltage sufficient that the output of hysteresis circuit 77 drops substantially to zero. Hysteresis circuit 77 may be adjusted such that no output voltage is produced until rotor speed has been decreased 5 percent, for example, from the normal operating value. This tolerance of say 5 percent will yield an ample region in which the automatic engine power controls may operate to maintain rotor speed at its normal value and will then permit of immediate response to movements of the collective lever 52 without causing an emergency overriding signal from hysteresis circuit 77. Similarly overspeeding of the main rotor must be avoided where the pilot commands either through transducer 90 or through rate of climb adjustment 74 an excessive rate of descent. It is usual to permit overspeeding of the main rotor up to, for example, 30 percent beyond its normal operating speed so that a margin of autorotative safety may be stored as kinetic energy to flair out the final touchdown. If the pilot commands a rate of descent which would require a higher rotor speed than say 30 percent above normal, then the increased voltage from rotor tachometer 76 will cause an output from hysteresis circuit 77 which will overpower any other input signal to network 82. Servomotor 71 will be driven to increase the collective blade pitch 61 so that the rotor will not exceed a predetermined speed of approximately 30 percent above normal. In the event of engine failure at high altitude the rate of climb adjustment potentiometer 74 may be set to accommodate the rate of descent associated with autorotation at the normal rotor operating speed. Thus the system will find a true null, since the output of hysteresis circuit 77 will be zero. Such setting of the rate of climb adjustment potentiometer 74 will achieve the maximum glide angle so that suitable landing fields will be within the gliding radius. During this period of glide the craft will be responsive to motions of the pilot's collective stick 52 to slightly increase or slightly decrease this rate of descent since the hysteresis 77 is not overpowering the pilot's commands. As the helicopter approaches the ground, at, for example, not less than several hundred feet, the rate of climb adjustment potentiometer 74 may be adjusted to its maximum rate of descent setting. This setting is such that the rate of descent will be accompanied by a main rotor speed of substantially 30 percent above normal to accommodate a margin of autorotative safety. On approaching the ground the pilot may flair out his touchdown by exerting an upward force on the collective stick 52, utilizing the kinetic energy stored in the rotor blades as they slow down from 30 percent above normal to 5 percent below normal operating speed. During this autorotative landing operation the hysteresis circuit 77 will be operating within its region of zero output and the pilot will have complete control over the balde pitch 61 through his collective stick 52. It will be appreciated that at all times integrator 69 is within the system and its input is always responsive to its output so that the integrator cannot run away to saturation.

In the stabilization mode of the pitch channel, position servo 28 is always operating substantially about its zero position and even its limited authority is sufficient to completely stabilize the craft for all pitch commands if the center of gravity trim is correct. Because of the substantially linear relationship between the absolute position of stick 2 and the resultant pitch signal 18 of the gyro horizon, I may measure the absolute position of the cyclic stick 2 by means of transducer 30. Velocity servo 31 serves to set the cyclic stick 2 in a certain absolute pitch position without the necessity of maintaining control pressures in order to secure a certain fuselage tilt 15 and hence substantially a certain airspeed. However, in the roll, yaw, and collective channels, no such proportional relationship exists as for the pitch channel; and hence I measure only the motion of a pilot's control relative to the output shaft of the associated velocity servo. A position servo provides proportional control for the associated channel, but only within a region of limited authority. If a position servo approaches one of its limit stops, a signal of an appropriate polarity is applied to the associated velocity servo to reposition the pilot's control until the position servo is operating within its limited region. Thus for the roll, yaw and collective channels the system combines an on-off contactor-type velocity servo with a proportional servo to secure the advantages of each.

My flight control system is also adapted to, from any airspeed, altitude, and heading, bring a helicopter motionless to a hover headed into the wind at a selected altitude. When the stand-by switch 115 is closed, power from positive terminal 110 is applied to the timer 98 and through terminal 112 to the fore-and-aft Doppler section 45, the radio altimeter 93, and the left-right Doppler section 103, which is used both in the collective and the roll channels. Timer 98, after a time delay sufficient for warm-up of the two Doppler radar sections and the radio altimeter, closes switch 99 and renders the armatures of switches 100 and 101 responsive to the Doppler vertical velocity meter 102 and the output of differentiator 97, respectively. In stand-by operation, with switch 115 closed, after the necessary time-delay for warm-up of equipment, motions of the pilot's collective lever 52 or the rate of climb adjustment potentiometer 74 may be compared with the output of either the barometric rate of climb meter 65 or the output of the Doppler vertical velocity meter 92 or the differentiated output of the radio altimeter 93. It will be appreciated that since the radio altimeter 93 provides the absolute altitude of the craft above the terrain below, the output of differentiator 97 will represent the vertical velocity 62 of the craft. Thus only in the stand-by condition, with switch 115 closed, can the pilot, by motion of three-position switch 102, command a vertical velocity governed by either the Doppler vertical velocity meter 92 or the radio altimeter differentiator 97. The gains of vertical velocity meter 92 and of differentiator 97 should be made equal to that of barometric rate of climb meter 65 so that in any position of switch 102, for rates of climb and descent commanded solely by movements of collective lever 52, equal and opposite signals are coupled to network 75. This setting of gains for transducer 90 and the components yielding voltage at the armature of switch 102 will cause the output of network 75 to remain substantially zero and the output shaft 58 of position servo 71 to remain substantially stationary. Accordingly the closed loop response will be identical to the open loop response were the system disconnected. With stand-by switch 115 closed and timer 98 actuated, power is applied from terminal 112 through the now closed timer switch 99 to terminal 111. When pitch hover switch 43 is closed, the pitch attitude 15 of the craft will no longer be governed by the vertical gyro 18 but will instead be governed by ground speed relative to the terrain below. The closing of switch 43 now energizes relay actuating winding 40, drawing the armature of switch 41 into engagement with that contact which is connected to the movable contact of switch 29 and drawing the armature of switch 42 to engagement with that contact connected to the output of network 36. In the hovering mode of the pitch channel, the output of the Doppler fore-and-aft velocity meter 47 is compared with the outputs of transducer 32 and velocity adjustment potentiometer 33. If the pilot exerts no pressures on his cyclic control stick 2 and if the velocity adjustment potentiometer 33 is positioned for zero output voltage, then position servo 28 will move the cyclic control 11 until the output of Doppler fore-and-aft velocity meter 47 is zero. In the hovering mode there is no longer a proportional relationship between absolute stick position and ground speed, since absolute stick position is proportional only to airspeed. Accordingly in the hovering mode the absolute stick position transducer 30 is rendered ineffective to control the craft; and relative stick position transducer 32, which measures tension or compression in feel centering spring 4, is rendered operative. Also position servo 28 may be required to exceed its limited authority; and hence velocity servo 31 is no longer responsive to the pilot's beeper switch 35 but is instead rendered responsive to the output of limit stop switch 29 in order to automatically reposition the pitch cyclic stick 2 in the hovering mode. In order to obtain a damping signal for the hovering mode, I do not differentiate the output of Doppler velocity meter 47 since this would accentuate the noise inherent in such device. Rather I obtain an inertial damping in the hovering mode by means of the output signal of the accelerometer network 21. For a step function change in commanded ground speed solely by motion of the pitch cyclic stick 2, the gains of components 47 and 21 are adjusted to produce a voltage at network 44 of equal magnitude and opposite polarity to that produced by transducer 32 so that the output of network 36 will remain zero and the position servo output shaft 8 will remain stationary. Thus the closed and open loop responses will be identical. This adjustment in the damping afforded by accelerometer network 21 is slightly greater than critical so that the commanded velocity over the ground as measured by Doppler velocity meter 47 is approached exponentially dead-beat without overshooting the commanded ground speed. A change in commanded ground speed may also be produced by moving velocity adjusting potentiometer 33 from its zero position. This will result in a voltage being introduced into network 36 which will, now through a movement of position servomotor 28, force a motion of cyclic control 11 in pitch until the output of the fore and aft Doppler velocity meter 47 supplies an equal and opposite voltage so that the output of network 36 returns to zero. If the craft is hovering at zero fore-and-aft ground speed with no wind, the cyclic stick 2 will be in its neutral position since the airspeed of the craft is zero. If a wind now arises and the heading of the craft is maintained into the wind (as will be described in detail in the following paragraph), then the craft will drift backwardly and an output signal will be generated by Doppler velocity meter 47. This signal is coupled through network 44, network 36, and switch 42 to servomotor 38; and the position servo output shaft 8 will move towards one limit stop. If the wind velocity is sufficiently great, the movable contact of switch 29 will engage one of the two fixed contacts thereof, causing a signal to be coupled through switch 41 to the velocity servo 31. The pilot's stick 2 will thus be moved forwardly until the position servo output shaft 8 is driven from the limit stop an amount sufficient that the movable contact of switch 29 engages neither fixed contact. The craft air speed will be increased until it is equal to wind velocity and both the ground speed and the output of Doppler velocity meter 47 return to zero. Thus in the hovering mode of the pitch channel the interconnection between the position servo limit stop switch 29 and the velocity servo 31 is the same as for the roll, yaw, and collective channels in the stabilization mode. Since in the hovering mode the pilot's stick 2 is automatically repositioned in pitch by the velocity servo 31, the manual beeper switch 35 is rendered inoperative. In the hovering mode of the pitch channel, integrator 26 assumes increased importance, since position servo 28 will not operate merely about its zero position but will instead be required to operate from limit stop to limit stop.

In operation of the roll and yaw channels in the hovering mode, switch 163 is closed to energize relay actuating winding 60, which opens switch 161 and causes the armature of switch 162 to be responsive to the output of network 165. The opening of relay switch 161 de-energizes relay winding 209, permitting the armature of switch 210 to be responsive to the output of network 208. Thus when both stand-by switch 115 and switch 163 are closed, the yaw channel is rendered responsive to accelerometer 140 and to the roll pickoff 138 of the gyro horizon; and the roll channel is rendered responsive to the Doppler left-right velocity meter 167. If no pressures are exerted on the pilot's cyclic stick and if the left-right velocity adjustment potentiometer 153 is positioned for zero output voltage, then position servo 148 will cause motions of the cyclic control 131 until the output of Doppler velocity meter 167 is zero. It will be noted that the condition of zero output from the Doppler left-right velocity meter 167 may be accommodated with the craft broadside to the wind while maintaining zero ground speed, but only by a rotor tilt 132 into the wind and a fuselage tilt 135 into the wind with corresponding outputs from both the roll pickoff 138 of the vertical gyro and accelerometer 140. To maintain zero ground speed with the craft headed other than into the wind is an uncoordinated maneuver which will occasion an output from the skid-slip accelerometer 140. The output signals from both accelerometer 140 and vertical gyro 138 command a rate of turn in the yaw channel. The output of network 208 is impressed on position servomotor 202 causing a craft rate of turn 192 which increases until the corresponding output signal of the rate of turn gyro 197 is equal and opposite to the sum of the outputs from accelerometer 140 and vertical gyroscope 138. Thus the craft gradually turns into the wind until the output signals of the vertical gyro 138 and accelerometer 140 and the rate of turn gyro 197 all return to zero. Of course during this process of turning into the wind at a rate proportional to the fuselage tilt 135, as measured by components 140 and 138, the pitch channel will be simultaneously increasing the forward velocity and the roll channel will be simultaneously decreasing the sideways velocity so that the entire correction for wind is supplied by the pitch channel rather than by the roll channel. As the craft is turning into the wind, it will begin to drift backwardly. However, this will occasion an output from fore and aft Doppler velocity meter 47 which in a manner hereinabove described causes a movement of position servomotor 28 and a corresponding movement of cyclic control 11, increasing the forward rotor tilt 12 until the output of the Doppler velocity meter 47 returns to zero. Also the craft will begin to drift sidewardly during the turn into the wind. This will occasion an output from Doppler velocity meter 167. This forces the position servomotor 148 to reposition the cyclic control 131 and decrease the lateral rotor tilt 132 until the output of meter 167 returns to zero. It would obviously be inefficient, if not impractical, to force the craft to fly broadside into the wind at, for example, 40 knots in order to maintain zero ground speed. The coupling of the roll channel components 140 and 138 into network 208 of the yaw channel automatically insures a hover with the craft headed into the wind. If the pilot applies pressures to his rudder pedals 182, the craft will yaw out of the wind; and a portion of the wind correction must now be supplied through the roll channel, resulting in output signals from both vertical gyro 138 and accelerometer 140 due to the resulting fuselage tilt 135. The ground speed will remain zero; and the fuselage tilt 135 will be such that the sum of output signals from components 138 and 140 is equal and opposite to that of transducer 205. Since the ground speed of the craft is substantially zero, such maneuver is uncoordinated; and lateral forces will be felt by the pilot proportional to the amount of pressure exerted on rudder pedals 182 in precisely the same manner as if the pilot were performing an uncoordinated skidding or slipping turn at cruising speed. Because of the stiffness of spring 184 and because of the provision of dashpot damper 193, the pilot will appreciate these undesirable lateral forces by the pedal pressures required to produce them. In the hovering mode of the roll channel, inertial damping from the output of accelerometer network 141 is preferable to the differentiation of the output of Doppler velocity meter 167, since the later alternative would accentuate noise. The gains of components 167 and 141 are adjusted such that for a step function change in commanded left-right velocity solely by motion of the roll cyclic stick 2, the sum of the voltages of these components is equal and opposite to that produced by transducer 152 and position servo 148 will remain stationary. Identical closed and open loop responses will result; and the pilot will be equally at ease under instrument flight as under visual flight conditions. The pilot may also produce a velocity to the left or right by moving his velocity adjustment potentiometer 153 from its zero position. This will again result in a voltage being introduced into network 156 which will, now through a movement of position servo 148, force a motion of the cyclic control 131 until the output voltage of the Doppler velocity meter 165 supplies an equal and opposite voltage so that the output of network 156 returns to zero. At the same time the required craft acceleration and fuselage tilt to produce this lateral velocity causes a rate of turn to be developed in the yaw channel so that the craft heads into the new resultant wind. This in turn causes a slight correction in the pitch channel for the added quadrature component of velocity. When the pilot returns his velocity adjustment potentiometer 153 to its zero position, the lateral drifting motion will cease, accompanied by corrections in both the yaw and pitch channels to, respectively, head the craft into the true wind and maintain the airspeed of the craft precisely at the wind velocity so that the ground speed is zero.

In operation of the collective channel in the hovering mode, switch 88 is closed, energizing relay actuating winding 80 and drawing the armature of switch 81 into engagement with that contact which is connected to the output of the radio altimeter limiter 96. Thus if the pilot exerts no pressures on his collective stick 52 and permits his rate of climp adjustment potentiometer 74 to remain at its zero position, then the armature of switch 84 is responsive to the output of network 85 and hence to the radio altimeter 93. The altitude adjustment potentiometer 94 is set to that altitude which it is desired the craft maintain. At such altitude the output signals of the radio altimeter 93 and the altitude adjustment potentiometer 94 will be equal and opposite with the result that the output voltage of network 85 is zero. Again the output of the barometric rate of climb meter 65 is combined with the radio altimeter error signal in network 85 to provide damping so that the craft approaches the desired altitude dead-beat without overshoot.

For hovering operation over the ocean, however, the Doppler vertical velocity meter 92 and the radio altimeter 93 are responsive to wave motions as well. If the craft is maintaining a constant altitude which is equal to the setting of the altimeter adjustment potentiometer 94, the output of network 95 will alternatingly rise above and below zero due to the response of radio altimeter 93 to the crests and troughs of the waves below. The craft will tend to respond to the motion of the ocean waves, moving up and down, in order that the distance from the craft to the ocean surface remain constant. Since the frequency involved in wave motion is so low, it would indeed be difficult to filter the output of network 95 sufficiently that the craft would maintain a constant absolute altitude without causing the craft response to be too sluggish to changes in commanded altitude by adjustment of potentiometer 94. Furthermore, the frequency of ocean waves varies considerably. Radio altimeter limiter 96 restricts the maximum error signal produced at the output of network 95. It will be recalled that the restriction afforded by barometric altimeter limiter 68 is selected with regard to engine power primarily and to passenger comfort secondarily. However, the restriction afforded by radio altimeter limiter 96 is selected with regard to avoiding undue changes in absolute altitude caused by wave motion while at the same time permitting sufficient rates of climb and descent to achieve the commanded altitude without excessive delay. In practice, limiter 96 would restrict the error signal sufficiently that rates of climb and descent could not exceed one or two hundred feet per minute. Such setting of limiter 96 would severely restrict vertical motions of the craft due to wave action but would give a moderate speed of response in achieving approximately the desired average altitude. The pilot may override the radio altimeter 93 by moving either the collective stick 52 or the rate of climb potentiometer 74. Either of these motions results in the opening of one of switches 78 and 79, causing relay winding 83 to become de-energized, and permitting the armature of switch 84 to be responsive to the output of network 75. The collective blade pitch 61 will be altered until the craft climbs or descends at a rate such that the signal at the armature of three-position switch 102 is equal and opposite to the voltage introduced from either transducer 90 or potentiometer 74 into network 75. If the pilot releases pressure on the collective lever 52 or returns his rate of climb potentiometer 74 to its zero position, then switches 78 and 79 will be closed, energizing winding 83, and causing the armature of switch 84 to be again responsive to radio altimeter 93. It will be noted that the damping signal into network 85 for maintaining the craft altitude constant is always derived from the barometric rate of climb meter 65, since this sensor has less noise than either Doppler vertical velocity meter 92 or radio altimeter differentiator 97.

My copending application, Serial No. 765,252, filed October 3, 1958, now Patent 2,998,210, for an Automatic Hovering Control, points out that before a sonar dome may be lowered into the water, the absolute velocity of the craft should not exceed, for example, five knots. My flight control system, using Doppler radar for an approach to hover, can be used to bring the craft substantially to a hover over the ocean with but a negligible absolute ground speed.

Referring now to FIGURE 3, which shows a preferred form of the pitch channel of my flight control system, the pitch output 18 of the vertical gyro is connected to the input of a lead circuit indicated generally by the reference character 38a. Lead circuit 38a may be similar to differentiator 38 except that lead circuit 38a also comprises a feedback capacitor shunting the feedback resistor. The outputs of transducer 30 and of the vertical gyro 18 and of lead circuit 38a are combined in a network 37a. The outputs of accelerometer 20 and vertical gyro 18 are again combined in a network 21 such that the output thereof is independent of fuselage tilt and proportional only to horizontal craft acceleration. The output of network 21 is connected to the input of a lag circuit indicated generally by the reference character 26a. Lag circuit 26a is similar to integrater 26 except that lag circuit 26a also comprises a feedback resistor shunting the feedback capacitor. The output of the Doppler velocity meter 47 is connected to the input of integrator 26. The outputs of Doppler velocity meter 47 and of lag network 26a and of integrator 26 are combined in a network 27a.

The output of network 27a is connected to the input of a deadband hysteresis, or backlash circuit indicated generally by the reference character 29a. The output of deadband circuit 29a remains zero until the output of network 27a exceeds a predetermined positive or negative level as determined by the battery voltages of deadband circuit 29a. When the output of network 27a exceeds this level, then one of the diodes of hysteresis circuit 29a will conduct to provide an output voltage which follows input voltage. The output of backlash circuit 29a is impressed upon the velocity servo 31 and is also connected to the input of integrator 26. The output of network 27a is connected through a normally open relay switch, indicated generally by the reference character 41a, to one input of a network 39a. The other two inputs to network 39a comprise the output of network 37a and the output of the center of gravity trim adjustment potentiometer 34. The output of network 39a is impressed upon position servo 28. The input of integrator 26 is connected to its output through a normally closed relay switch indicated generally by the reference character 42a. If desired, the input of integrator 26 may instead be connected through switch 42a to the output of network 27a by actuating switch 26b.

In operation of the preferred form of the pitch channel shown in FIGURE 3, position servo 28 both in the hovering mode and in the stabilization mode is responsive not only to the attitude signal provided by vertical gyro 18 but also to the rate of change of attitude signal provided by lead circuit 38a. In the stabilization mode the normally closed relay switch 42a shorts out integrator 26, connecting its output directly to its input so that integrator 26 cannot run away to saturation; and normally open switch 41a prevents Doppler velocity meter 47 from affecting the commanded attitude of the craft. In the hovering mode, with switch 41a closed, the output of network 27a, which contains Doppler information, is impressed upon network 39a; and with switch 42a open, integrator 26 is no longer short-circuited. If the output of network 27a exceeds a predetermined level, then backlash circuit 29a will provide an output signal which is coupled through one of the crystals both to velocity servo 31 and to the input of integrator 26. This limiting action prevents integrator 26 from running away to saturation and causes velocity servo 31 to reposition, through spring 4, the pilot's cyclic stick 2 until the output signal of network 27a returns to the limited region defined by circuit 29a. It will be noted that the three inputs to network 27a comprise a signal proportional to ground speed, a signal proportional to the integral of ground speed, and a lagged acceleration signal. The lagged accelerometer signal partakes of the nature of an inertially computed velocity signal. The rate of change of attitude signal provided by lead circuit 38a is also indicative of craft translational acceleration fore-and-aft in a horizontal plane. It will be further noted that only the output of Doppler velocity meter 47 is integrated by integrator 26. The output of integrator 26 will, because of its smoothing effect, contain little of the noise inherent in Doppler velocity meter 47; and the output of lag circuit 26a, representing an inertially computed velocity, tends to minimize the noise output of Doppler velocity meter 47. It will be noted that position servo 28 is always responsive to the craft attitude signal appearing at the output of network 37a. In the hovering mode, backlash circuit 29a provides a signal to the input of integrator 26 which simultaneously prevents the output of network 27a from exceeding a certain level and causes velocity servo 31 to reposition the pilot's stick 2. It is only in the stabilization mode that integrator 26 is substantially short-circuited to prevent its running away.

Referring now to the preferred form of the roll channel shown in FIGURE 4, the roll output 138 of the vertical gyro is connected to the input of a lead circuit indicated generally by the reference character 158a. Lead circuit 158a is similar to differentiator 158 except for the additional provision of a feedback capacitor shunting the feedback resistor. The outputs of vertical gyro 138 and of lead circuit 158a are combined in a network 159a with the output of transducer 152. Again the outputs of vertical gyro 138 and of accelerometer 140 are combined in network 141 to produce a signal independent of fuselage tilt. The output of network is connected to the input of a lag circuit indicated generally by the reference character 146a. Lag circuit 146a is similar to integrator 146 but further comprises a feedback capacitor shunting the feedback resistor. The output of Doppler velocity meter 167 is connected to the input of integrator 146. The outputs of Doppler velocity meter 167 and of lag circuit 146a and of integrator 146 are combined in a network 147a. The output of network 147a is connected to the input of a hysteresis or backlash circuit 149a which is identical in construction to backlash circuit 29a. The output of hysteresis circuit 149a is connected both to velocity servo 151 and to the input of integrator 146. Mode selection is accommodated by a normally open relay switch and a normally closed relay switch indicated generally by the reference characters 161a and 162a, respectively. Normally closed relay switch 162a connects the input of integrator 146 to its output. If desired, switch 162a may instead connect the input of integrator 146 to the output of network 147a by actuating switch 146b. The output of network 147a is connected through normally open relay switch 161a to one input of a network 156a. The other input of network 156a comprises the output of network 159a. The output of network 156a is impressed upon position servo 148.

The operation of the preferred form of the roll channel of my flight control system shown in FIGURE 4 is similar to the operation of the preferred form of the pitch channel shown in FIGURE 3. In the stabilization mode, integrator 146 is short-circuited and cannot run away. In the hovering mode, position servo 148 is rendered responsive to the output of network 147a which contains Doppler information. In both the stabilization and hovering modes, position servo 148 is responsive to the attitude signal provided by the vertical gyro 138 and to the signal representing rate of change of attitude provided by lead circuit 158a. The lagged acceleration signal provided at the output of lag network 146a represents a noise-free velocity signal which tends to minimize and mask the noise inherent in Doppler velocity meter 167. The leaded vertical gyro signal at the output of circuit 158a is also indicative of craft left-right translational acceleration. Integrator 146 contains little noise in its output and is responsive only to Doppler velocity meter 167. If the output of network 147a exceeds predetermined limits, backlash circuit 149a provides a signal which both prevents integrator 146 from running away and also causes velocity servo 151 to reposition the pilot's stick 2 until the output of network 147a lies within such predetermined limits.

It will be noted that I have used the left-right Doppler section 103 to provide a vertical velocity signal. But such Doppler vertical velocity signal might also be provided not only by an additive combination of the outputs of the fore-and-aft Doppler section 45 but also by an additive combination of the outputs of both Doppler sections 45 and 103. If the craft is hovering headed into the wind, then the use of section 103 to indicate vertical velocity is good for detecting the passage of wave crests but poor for maintaining a constant rate of climb; and the use of section 45 to indicate vertical velocity would be good for maintaining a constant rate of climb but poor for detecting the passage of wave crests. The additive combination of the four discriminator outputs of both Doppler sections to indicate vertical velocity would give intermediate characteristics regardless of the craft heading. The Doppler transmitting and receiving horns may be stabilized in a horizontal plane as shown in Patent No. 2,908,903, issued on an application filed October 3, 1951. However, I do not align the Doppler horns with the groundtrack. My Doppler horns remain aligned with the longitudinal and athwartship axes of the craft regardless of the drift angle and ground track. Thus the signals from meters 47 and 167 may be applied directly to the pitch and roll controls, respectively, without the necessity of employing resolvers for coordinate transformation where a drift angle exists and ground track does not coincide with heading.

For instrument landings, whether at sea or on an airport, it may be necessary to maintain a heading other than directly into the wind. For one example, assume that a sea rescue landing must be made under zero-zero conditions with heavy seas. The survivors to be rescued are equipped only with a radio transmitter and receiver. The pilot may then locate the survivors from their radio transmissions with the use of automatic direction finding equipment well known to the art. The pilot, upon radio interrogation of the survivors, learns only that the sea is running from a direction 30° clockwise from the wind direction. The pilot closes switch 163, causing Doppler meter 167 to reduce athwartship motion to zero. Accelerometer 140 and vertical gyro 138 causes a gradual change in craft heading until aligned with the wind. Thus the pilot may find the wind to be from 210°. The pilot then closes a switch 161a which applies voltage from the ungrounded terminal of winding 160 through switch 207 to energize winding 209 and enabel the gyro compass 195. By actuating switch 212, the craft is brought to a heading of 240° which is 30° clockwise from the wind. The craft may now be landed after the passage of a wave crest with the assurance that subsequent waves will be caught substantially on the bow. Under high sea states it is essential that the craft land headed into the waves to reduce the danger of capsizing or damaging the rotor. There will be a left cross-wind. The craft will be rolled slightly to the left by Doppler meter 167, inducing a sufficient side-slip to maintain the athwartship velocity relative to the water at zero despite the cross-wind. For another example, asume an instrument landing is to be made on an airport having localizer and glide-slope facilities and that the craft is provided with the usual cross-pointer instrument well known to the art. The pilot is informed by the tower operator that runway 24 (240°) is to be used and there is a left cross-wind from 210°. The pilot wil now intercept the localizer and turn to the runway heading of 240°. Switch 163 is closed to energize winding 160; and switch 161a is closed to enabel the gyro compass 195. The craft will maintain a heading of 240°; and the wind-drift correction will be accommodated by side-slipping to the left until the output of the athwartship Doppler velocity meter 167 is zero. Thus the ground track will coincide with the heading despite the cross-wind. If the localizer needle drifts off-center, the pilot may induce an athwartship motion either by moving the stick 2 in roll or by turning the lateral velocity adjustment potentiometer 153. This will vary the amount of side-slip by actuation of roll cyclic control 131. Switch 43 may be left open to maintain a constant forward airspeed. Or switch 43 may be closed and velocity potentiometer 33 may be adjusted to produce a constant forward groundspeed. As the craft proceeds down the localizer, the pilot may maintain the glide-slope needle centered by movement either of the collective lever 52 or of the rate of descent potentiometer 74. Conveniently the setting of the rate of descent potentiometer 74 may be made equal to the value published on the instrument landing chart of the airport for the particular ground speed indicated by Doppler velocity meter 47. Then the pilot may maintain the glide-slope needle centered by small forces on lever 52 to vary slightly the rate of descent from the nominal published value. The craft will thus land aligned with the runway. No lateral forces will be applied to the wheels. Unless castoring wheels are used it is essential that the craft land aligned with the runway to reduce danger of ground-loop or roll-over or of tire blow-out. In the prior art aircraft are crabbed into the wind to maintain the localizer needle centered. Upon visual ground contact, the pilot must quickly contact, the pilot must quickly kick the rudder and change aircraft heading until aligned with the runway. These last minute corrections are obviously undesirable. In my flight control system such violent maneuvers are obviated; and the critical transition from instrument flight to visual flight is simplified since the runway appears dead ahead as a pilot might expect.

As will be appreciated by those skilled in the art, the equivalent circuit of each channel comprises a closed loop system containing many serially connected components which art as low-pass filters. In each channel corner frequencies exist for the position servo and the hydraulic servo. In each of the pitch and roll channels there are corner frequencies in the response of rotor tilt to movements of the cyclic control. In the collective and yaw channels there are corner frequencies in the response of craft vertical velocity and rate of turn, respectively, to changes in blade pitch. Furthermore, in the collective channel, altitude is inherently the integral of vertical velocity; and in the yaw channel, heading is inherently the integral of rate of turn. Each of these serially connected low-pass filters of the equivalent circuit of a channel introduces a phase shift approaching 90 degrees with frequencies greater than its corner frequency. The gain of a channel cannot be increased indefinitely without causing instability due to phase shifts of 180 degrees being reached before the open loop gain has dropped below unity. It is essential for fast response that phase shifts be held to a minimum; and this is the reason for providing position follow-up devices for servos 28, 74, 148, and 202 in order to convert them from integrating velocity servos into position servos. Furthermore, none of the integrators 26, 69, 146, and 200 are serially connected in the closed loop of a channel. Rather each integrator is connected in parallel so that each position servo is responsive not only to the integral of the difference signal but also to the difference signal itself. It will be appreciated that to serially connect an integrator would introduce an undesirable phase lag of 90 degrees. By integrating a difference signal and combining through an electrical network the integrated difference signal with the difference signal itself, I may provide infinite system gain at zero frequency and yet maintain system stability at frequencies where phase shifts of 180 degrees have been developed.

It will be seen that I have accomplished the objects of my invention.

My flight control system is always responsive to and never opposes pilot commands. My flight control system produces craft responses identical to those which would result were the system disconnected; and the pilot will be equally at ease under instrument flight as under visual flight conditions. My flight control system is provided with integrators which provide infinite gain at zero frequency and reduce the steady state error to zero. In my flight control system the input of each integrator, regardless of pilot commands, is always responsive to its output; and no integrator can run away to saturation. My flight control system is operative through the complete flight regime without the necessity for readjustment by the pilot. My flight control system will, from any airspeed, altitude, and heading, bring a helicopter motionless to a hover at a predetermined altitude headed into the wind.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A control system for a craft including in combination means responsive to a certain craft motion for providing a first signal, a manually movable member, means responsive to the steady state position of the member for providing a second signal, means responsive to the first and second signals for providing a difference signal, means for continuously integrating the difference signal to provide a command quantity, the integrating means having a gain which approaches infinity as frequency approaches zero, and means responsive to movements of the member and to the command quantity for controlling said craft motion.

2. A control system for a craft including in combination means responsive to a certain craft motion for providing a first signal, a manually movable member, means continuously responsive to manually induced movements of the member for providing a second signal, means responsive to the first and second signals for providing a difference signal, means for continuously integrating the difference signal to provide a command quantity, and means responsive to the difference signal and to the command quantity and to manually induced movements of the member for controlling said craft motion.

3. A control system for a craft including in combination a manually movable member, means continuously responsive to manually induced movements of the member for providing a first signal, means responsive to a certain craft motion for providing a second signal, means providing a third signal varying as a function of the rate of change of said craft motion, means responsive to the first and second and third signals for providing a difference signal, means for continuously integrating the difference signal to provide a command quantity, and means responsive to the command quantity and to manually induced movements of the member for controlling said craft motion.

4. A control system for a craft including in combination a manually movable member, means continuously responsive to manually induced movements of the member for providing a first signal, means responsive to a certain craft motion for providing a second signal, means providing a third signal varying as a function of the rate of change of said craft motion, means responsive to the first and second and third signals for providing a difference signal, means for continuously integrating the difference signal to provide a command quantity, and means responsive to the difference signal and to the command quantity and to manually induced movements of the member for controlling said craft motion.

5. A control system for a craft including in combination a transducer responsive to a certain craft motion, means responsive to the transducer for providing an error signal, means for continuously integrating the error signal, means responsive to the integrating means for providing a control quantity, means responsive to the control quantity for governing said craft motion, an actuable switch, and means responsive to actuation of the switch and including a negative feedback circuit for rendering the control quantity unresponsive to the transducer.

6. A control system for a craft including in combination means providing an error signal, means for continuously integrating the error signal, first means responsive to the integrating means for providing a first negative feedback path to the error signal means, second means responsive to the integrating means for providing a second negative feedback path to the error signal means, the second feedback path including a transducer responsive to craft motion, a switch having a first and a second position, means responsive to the first switch position for disabling the second feedback path, and means responsive to the second switch position for enabling the second feedback path, the first feedback path being enabled in the first switch position.

7. A control system for a craft including in combination a manually movable member, centering means including resilient means operatively associated with the member, means for variably positioning the centering means, a servomotor, means responsive to movement of the member and to the servomotor for controlling a certain craft motion, means continuously responsive to manually induced movements of the member for providing a first signal, a transducer responsive to said craft motion, means responsive to the transducer for providing a second signal, means providing a third signal varying as a function of the rate of change of said craft motion, means responsive to the first and second and third signals for controlling the servomotor, a switch responsive to stress in the resilient means and having an actuated state when the resilient means is under stress, and means responsive to the actuated state of the switch for reducing the second signal toward zero.

8. A control system for a craft including in combination a manually movable member, centering means operatively associated with the member, means for variably positioning the centering means, a servomotor, means responsive to movement of the member and to the servomotor for controlling craft motion, means for providing a signal as a function of the absolute position of the member irrespective of the position of the centering means, and means responsive to the signal for controlling the servomotor.

9. A control system for a craft including a combination a manually movable member, centering means including resilient means operatively associated with the member, means for variably positioning the centering means, a servomotor, means responsive to movement of the member and to the servomotor for controlling craft motion, a first transducer providing a signal varying as a function of the absolute position of the member, a second transducer providing a signal varying as a function of stress in the resilient means, a switch having a first and a second position, means responsive to the first switch position for rendering the servomotor responsive to the first transducer signal, and means responsive to the second switch position for rendering the servomotor responsive to the second transducer signal.

10. A control system for a craft including in combination a manually movable member, centering means operatively associated with the member, means for providing a signal as a function of the absolute position of the member irrespective of the position of the centering means, control means responsive to the signal, means responsive to the control means and to movement of the member for governing craft motion, and means responsive to the control means for variably positioning the centering means.

11. A control system for a craft including in combination a manually movable member, centering means operatively associated with the member, means for variably positioning the centering means, means continuously responsive to manually induced movements of the member for generating a first signal, control means, means responsive to the control means and to movement of the member for governing craft motion, means responsive to the control means for generating a limit signal defining a dead-band region, and means coupling the first signal and the limit signal to the control means.

12. A control system for a craft including in combination a manually movable member, centering means operatively associated with the member, means continuously responsive to manually induced movements of the member for generating a first signal, control means responsive to the first signal, means responsive to the control means and to movement of the member for governing craft motion, means responsive to the control means for generating a limit signal defining a dead-band region, and means responsive to the limit signal for variably positioning the centering means.

13. A system for controlling the motion over the earth of an aircraft moving relative to an air mass including in combination an aircraft having a longitudinal heading axis and an athwartship axis, means providing an earth-referenced signal responsive to athwartship aircraft motion, means responsive to said signal for rolling the aircraft about its longitudinal axis while maintaining a substantially constant aircraft heading to produce an aircraft velocity relative to the air mass having a component along the horizontal projection of the athwartship axis, and means responsive to a persistent average athwartship velocity component for gradually changing the aircraft heading.

14. A system for controlling the motion over the earth of an aircraft having a heading axis and an athwartship axis including in combination means for providing an earth-referenced error signal responsive to athwartship aircraft motion, means responsive to the error signal for side-slipping the aircraft in a direction to decrease the error signal while maintaining a substantially constant aircraft heading, and means responsive to a persistent slip to one side for gradually changing the aircraft heading in a direction to decrease the average side-slip.

15. A system for controlling the course over the earth of an aircraft moving relative to an air mass including in combination an aircraft having a longitudinal heading axis and an athwartship axis, means for transmitting energy, means for receiving a portion of said energy, the receiving means being mounted on the aircraft, means for maintaining the aircraft on a predetermined heading substantially equal to a desired course over the earth, means responsive to the receiving means for providing an earth-referenced signal varying as a function of athwartship aircraft motion, and means responsive to said signal for rolling the aircraft about its longitudinal axis while maintaining said heading to produce an aircraft velocity relative to the air mass having a component along the horizontal projection of the athwartship axis.

16. A system for controlling the track over the earth of an aircraft having a heading axis and an athwartship axis including in combination means for transmitting energy, means mounted on the aircraft for receiving a portion of said energy, means for maintaining the aircraft on a predetermined heading substantially equal to a desired track over the earth, means responsive to the receiving means for providing an earth-referenced error signal varying as a function of athwartship aircraft motion, and means responsive to the error signal for side-slipping the aircraft in a direction to decrease the error signal while maintaining said aircraft heading.

17. A flight control system for an aircraft having an athwartship axis including in combination means for transmitting energy, means mounted on the aircraft for receiving a portion of said energy, means responsive to the receiving means for providing an earth-referenced signal varying as a function of athwartship aircraft motion, and means responsive to said signal for producing an aircraft side-slip and a resulting component of relative wind along the athwartship axis.

18. A flight control system for an aircraft having a longitudinal axis including in combination means for controlling the aircraft in pitch, means responsive to the longitudinal velocity of the aircraft for providing a longitudinal velocity signal, means responsive to the longitudinal acceleration of the aircraft for providing a longitudinal acceleration signal, and means coupling both signals to the pitch control means.

19. A flight control system for an aircraft having a longitudinal heading axis and an athwartship axis including in combination means for controlling the aircraft in pitch, means for transmitting energy, means mounted on the aircraft for receiving a portion of said energy, means responsive to the receiving means for providing an earth-referenced signal varying as a function of athwartship aircraft motion, means responsive to longitudinal aircraft velocity over a wide range of speeds for providing a longitudinal velocity signal, means coupling the longitudinal velocity signal to the pitch control means, and means responsive to the earth-referenced athwartship motion signal for producing an aircraft side-slip and a resulting component of relative wind along the athwartship axis.

20. A flight control system for an aircraft having a longitudinal axis including in combination means responsive to longitudinal aircraft velocity over a wide range of speeds for providing a longitudinal velocity signal, means responsive to aircraft vertical velocity over a wide range of altitudes for providing a vertical velocity signal, means for controlling the aircraft in pitch, the aircraft having continuously rotating means for producing thrust forces, means for controlling the thrust forces produced by said rotating means, means coupling the longitudinal velocity signal to the pitch control means, and means coupling the vertical velocity signal to the thrust control means.

21. A flight control system for an aircraft having an athwartship axis including in combination transmitting means mounted on the aircraft for directing energy toward the earth, first means mounted on the aircraft for receiving, earth-reflected energy from a port azimuthal direction constantly aligned with the horizontal projection of the athwartship axis, second means mounted on the aircraft for receiving earth-reflected energy from a starboard azimuthal direction constantly aligned with the horizontal projection of the athwartship axis, and means responsive to the first and second receiving means for producing an aircraft side-slip and a resulting component of relative wind along the athwartship axis.

22. A flight control system for an aircraft having a longitudinal axis including in combination transmitting means mounted on the aircraft for directing energy toward the earth, first means mounted on the aircraft for receiving earth-reflected energy from a forward azimuthal direction constantly aligned with the horizontal projection of the longitudinal axis, second means mounted on the aircraft for receiving earth-reflected energy from an aft azimuthal direction constantly aligned with the horizontal projection of the longitudinal axis, and means responsive to the first and second receiving means for controlling the aircraft in pitch.

23. A flight control system for an aircraft operating over a body of water having wind induced wave motion, said aircraft having an athwartship axis and a heading axis, including in combination transmitting means mounted on the aircraft for directing energy toward the water, first and second means mounted on the aircraft for receiving water-reflected energy from opposite azimuthal directions constantly aligned with the horizontal projection of the athwartship axis, the first receiving means providing a first signal, the second receiving means providing a second signal, means combining the first and second signals with a predetermined polarity to provide a third signal varying as a function of the athwartship component of aircraft velocity relative to the water, means responsive to the third signal for changing aircraft heading in a direction to reduce the athwartship velocity component toward zero, and means combining the first and second signals with an opposite polarity to provide a resultant signal indicating the occurrence of wave crests.

24. A flight control system for an aircraft having a longitudinal axis and an athwartship axis including in combination means for transmitting energy, means mounted on the aircraft for receiving a portion of said energy, means responsive to the receiving means for providing an earth-referenced velocity signal varying as a function of the horizontal component of aircraft velocity along a certain one of said axes, means including an accelerometer for providing an acceleration signal varying as a function of the horizontal component of aircraft acceleration along said certain axis, and means responsive to the velocity and acceleration signals for controlling motion of the aircraft about the other of said axes.

25. A control system for a craft having a pitch axis and a roll axis including in combination a stabilized platform mounted on the craft, means responsive to relative motion between the platform and the craft about one of said axes for providing a direct-current signal, a high-gain direct-current amplifier having a negative feedback circuit comprising a resistor and an input circuit comprising a capacitor, means coupling the direct-current signal to the input circuit, a manually movable member, means continuously responsive to manually induced movements of the member for providing a second signal, and means responsive to the amplifier and to the second signal and to manually induced movements of the member for controlling craft motion about said axis.

26. A control system for a craft including in combination means responsive to a certain craft motion for providing a first signal, a manually movable member, means continuously responsive to manually induced movements of the member for providing a second signal, means responsive to the first and second signals for providing a direct-current error signal, a high-gain direct-current amplifier having an input circuit comprising a resistor and a negative feedback circuit comprising a capacitor, means coupling the error signal to the input circuit, and means responsive to manually induced movements of the member and to the amplifier for controlling said craft motion.

27. A flight control system for an aircraft operating over a body of water having wind induced wave motion, the aircraft having a longitudinal roll axis and an athwartship pitch axis and rotating means for producing thrust forces, including in combination a first member manually movable in pitch, resilient pitch centering means operatively associated with the first member, means for variably positioning the pitch centering means, a first transducer providing a signal as a function of the absolute pitch position of the first member, a second transducer providing a signal as a function of stress in the resilient pitch centering means, transmitting means for directing energy toward the water, first means for receiving water-reflected energy from fore and aft directions aligned with the horizontal projection of the longitudinal axis, means responsive to the first receiving means for providing a longitudinal velocity signal, a stable platform providing a direct-current signal as a function of aircraft pitch, a first high-gain direct-current amplifier having a negative feedback resistor and an input capacitor, means coupling the platform signal to the input capacitor, an accelerometer providing a signal as a function of forces parallel to the longitudinal axis, a first switch having a first and a second position, first control means, means responsive to the first control means and to pitch movement of the first member for governing aircraft pitch, means responsive to the first control means for generating a limit signal defining a dead-band region, means for providing a direct-current error signal, means coupling the platform signal to the error means, a second high-gain direct-current amplifier having a negative feedback capacitor and an input resistor, means coupling the error signal to the input resistor, means coupling the second amplifier and the error signal to the first control means, means subject to the first position of the first switch for coupling the first transducer and limit signals and the first amplifier to the error means, means subject to the second position of the first switch for coupling the longitudinal velocity and accelerometer and second transducer signals to the error means and for coupling the limit signal to the variable pitch positioning means, a second manually movable member, second resilient centering means operatively associated with the second member, a second switch having an actuated state in response to stress in the second resilient means, a third transducer providing a signal as a function of stress in the second resilient means, second and third means for receiving water-reflected energy from port and starboard directions aligned with the horizontal projection of the athwartship axis, means differentially responsive to the second and third receiving means for providing an athwartship velocity signal, means additively responsive to the second and third receiving means for providing a signal as a function of the vertical velocity of the aircraft relative to the waves, means providing a signal as a function of deviation from a desired altitude, second control means, means responsive to the second control means and to movement of the second member for governing the thrust forces produced by said rotating means, means coupling the altitude deviation and third transducer and vertical velocity signals to the second control means, means subject to the actuated state of the second switch and including a negative feedback circuit for reducing the altitude deviation signal toward zero, a third switch having a first and a second position, means responsive to the athwartship velocity signal for rolling the aircraft about its longitudinal axis while maintaining a constant aircraft heading to produce a side-slip, means subject to the first position of the third switch and responsive to a persistent slip to one side for gradually changing the aircraft heading in a direction to decrease the average side-slip, and means subject to the second position of the third switch for maintaining the aircraft on a predetermined heading irrespective of a persistent side-slip.

28. A flight control system for an aircraft having an athwartship axis including in combination means for providing a signal in accord with aircraft vertical velocity, means for providing an earth-referenced signal as a function of athwartship aircraft motion, the aircraft having continuously rotating means for producing thrust forces, means responsive to the athwartship motion signal for producing an aircraft side-slip, and means responsive to the vertical velocity signal for controlling the thrust forces produced by said rotating means.

References Cited in the file of this patent

UNITED STATES PATENTS

| | | |
|---|---|---|
| 2,234,326 | Tiebel | Mar. 11, 1941 |
| 2,408,472 | Moynihan | Oct. 1, 1946 |
| 2,445,940 | Copeland | July 27, 1948 |
| 2,451,263 | Webb | Oct. 12, 1948 |
| 2,478,033 | Weick | Aug. 2, 1949 |
| 2,605,063 | Gilruth | July 29, 1952 |
| 2,626,767 | Bromley | Jan. 27, 1953 |
| 2,671,620 | Andrews | Mar. 9, 1954 |
| 2,733,878 | Ciscel | Feb. 7, 1956 |
| 2,740,961 | Slater | Apr. 3, 1956 |
| 2,750,110 | Och | June 12, 1956 |
| 2,832,551 | Gille | Apr. 29, 1958 |
| 2,834,563 | Miller | May 13, 1958 |
| 2,844,338 | Keith | July 22, 1958 |
| 2,852,212 | Mallery et al. | Sept. 16, 1958 |
| 2,865,019 | Harrison | Dec. 16, 1958 |
| 2,866,190 | Berger | Dec. 23, 1958 |
| 2,875,965 | Anderson et al. | Mar. 3, 1959 |
| 2,890,844 | Cooper | June 16, 1959 |
| 2,891,725 | Blumenthal | June 23, 1959 |
| 2,903,205 | Borngesser | Sept. 8, 1959 |
| 2,923,001 | Morgan | Jan. 26, 1960 |
| 2,923,503 | Vogel | Feb. 2, 1960 |
| 2,934,292 | Visser | Apr. 26, 1960 |
| 2,936,135 | Zupanick | May 10, 1960 |
| 2,939,653 | Rasmussen | June 7, 1960 |
| 2,945,649 | Metcalf | July 19, 1960 |
| 3,021,097 | Hecht | Feb. 13, 1962 |

FOREIGN PATENTS

| | | |
|---|---|---|
| 110,369 | Australia | Apr. 24, 1940 |